Jan. 1, 1974 J. T. KENNEY 3,783,005

METHOD OF DEPOSITING A METAL ON A SURFACE OF A NONCONDUCTIVE SUBSTRATE

Filed Feb. 4, 1972

United States Patent Office 3,783,005
Patented Jan. 1, 1974

3,783,005

METHOD OF DEPOSITING A METAL ON A SURFACE OF A NONCONDUCTIVE SUBSTRATE

John Thomas Kenney, Lawrence Township, Mercer County, N.J., assignor to Western Electric Company, Incorporated, New York, N.Y.

Filed Feb. 4, 1972, Ser. No. 223,522
Int. Cl. C23c 3/02
U.S. Cl. 117—212 36 Claims

ABSTRACT OF THE DISCLOSURE

A method of depositing a metal on a surface of a nonconductive substrate is disclosed. A surface of the substrate is first sensitized with a wetting-sensitizer comprising a sensitizing species, e.g., $Sn^{+2}$, combined with an aqueous colloidal wetting solution, selected from among solutions revealed in application Ser. No. 8,022, filed Feb. 2, 1970. Alternatively, the surface may be first rendered hydrophilic by treating the surface with the colloidal wetting solution, followed by sensitization with a non-wetting sensitizer. The sensitized surface is activated and then exposed to an electroless plating bath. In a second embodiment, the substrate surface is first coated with a wetting-photopromoter comprising a positive photopromoter species, including one selected from among those revealed in U.S. Pat. 3,562,005, combined with the aqueous colloidal wetting solution. Again, alternatively, the substrate may be first rendered wettable by treatment with the colloidal wetting solution whereafter a conventional (non-wetting) photopromoter solution (positive or negative) is applied thereto. The photopromoter-coated surface is selectively exposed to a source of ultraviolet radiation to produce a pattern comprising at least one area of the surface capable of reducing a precious metal from a precious metal salt. The exposed substrate is then immersed in a solution comprising a salt of the precious metal to obtain a precious metal pattern. The precious metal pattern may then be exposed to an electroless plating bath to deposit electroless metal thereon.

BACKGROUND OF THE INVENTION

(1) Field of the invention

This invention relates to a method of depositing a metal on a surface of a nonconductive substrate and, more particularly, to depositing a metal on a nonconductive substrate by means of electroless metal deposition.

(2) Discussion of the prior art

It is commonplace today to generate metallic patterns on electrically insulative substrates. These patterns may find use as electrical circuitry, as decorative formations, or the like. Metallic pattern generation may be affected by a wide variety of methods. Of special importance herein are methods which include a step of electroless plating, which may be followed by electroplating or further electroless plating of the electroless pattern. A typical electroless metal deposition process which is employed includes first sensitizing at least one area of a surface of an insulative substrate. Sensitization includes applying to the area a sensitizer solution, e.g., a stannous chloride solution, capable of reducing an activating metal ion, e.g., $Pd^{+2}$, to an activating metal, e.g., Pd. The sensitized surface is then immersed in an activating solution, comprising an activating metal salt, wherein an activating metal is reduced on the area sensitized. The activating metal-reduced surface is then subjected to a conventional electroless metal deposition bath.

A novel additive method employing electroless plating is the photoselective metal deposition process of M. A. De Angelo et al., U.S. Pat. 3,562,005, assigned to the assignee hereof. In the novel additive process of metallic pattern generation of U.S. Pat. 3,562,005, incorporated by reference hereinto, patterns are generated without etching or photoresist masking. Specifically, a solution, called a "photopromoter" which has (or at least a part of which has) the ability to be retained on a substrate is applied to the substrate. The retained photopromoter has a photopromoter species which is capable of changing oxidation state upon exposure thereof to appropriate radiation. In one oxidation state (but not both) the photopromoter species is able to reduce, from a salt solution thereof, a precious metal (there defined as palladium, platinum, gold, silver, osmium, indium, iridium, rhenium, rhodium). The precious metal initiates an autocatalytic electroless plating process.

After the substrate retains some of the photopromoter, it is selectively exposed to the appropriate radiation, specifically, ultraviolet radiation of short wavelength and below 3,000 A. This exposure renders some portions of the substrate able to reduce the precious metal, and rendering other portions not so capable. Subsequently, electroless metal is deposited only where it is desired, i.e., on the reduced precious metal.

Where the substrate to be metal patterned is hydrophobic, as for example in the case of many organic polymeric substrates (e.g., polytetrafluoroethylene, polyethylene, etc.), it is often very difficult to achieve "practical wetting" thereof by sensitizing solutions (conventional electroless metal deposition). Also it is sometimes difficult to achieve "practical wetting" by some potential photopromoters (photoselective metal deposition). "Practical wetting" is defined as the abilty of a surface to retain, on a substantially microscopically smooth, unroughened portion thereof, a continuous, thin, uniform layer of a liquid, such as water or other liquid medium, when the surface is held vertically, or in any other non-horizontal orientation.

In order to achieve wetting of a hydrophobic surface by the sensitizing solutions in conventional electroless metal deposition processes, the hydrophobic surface is usually first mechanically roughened or chemically pickled, hydrolyzed or oxidized, prior to applying the sensitizing solution. A typical process of electroless metal deposition wherein chemical treatment or pickling has to be carried out in order to achieve wetting or adhesion of the hydrophobic surface by a sensitizing solution is disclosed in U.S. Pat. 3,616,296. However, chemical treatment or pickling (as well as mechanical roughening) has a disadvantage that it may degrade the surface region of the hydrophobic material, e.g., a plastic, and/or lead to a loss in resolution quality or brightners of the resultant electroless metal deposit.

It is therefore desirable to obtain improved wetting or practical wetting of a hydrophobic surface destined to be subjected to either a conventional electroless metal deposition process or the photoselective metal deposition process of U.S. Pat. 3,562,005, previously referred to, without roughening or pickling the surface and this is an object of the present invention. It is also desired to improve even further the already excellent adhesive properties of resultant metal films, achieved through the photoselective metal deposition process of U.S. Pat. 3,562,005 and this is an object of the present invention.

SUMMARY OF THE INVENTION

This invention relates to a method of depositing a metal on a surface of a substrate and more particularly, to depositing a metal on a nonconductive substrate by means of electroless metal deposition.

In a first embodiment, a suitable substrate is first sensitized with a wetting sensitizer solution comprising a sensitizing species, e.g., $Sn^{+2}$ ions, combined with a stable aqueous colloidal solution, formed by a hydrolysis and nucleation reaction, comprising insoluble hydrous oxide particles of one or more selected elements, the particles having a size within the range of 10 A. to 10,000 A. The hydrolysis reaction includes dissolution of a salt of the selected element in an aqueous medium and maintenance of the pH of the aqueous medium at a point where no fluocculate results. Alternatively, the substrate may be sensitized by first rendering the substrate hydrophilic or more wettable by coating the substrate or a surface thereof with the stable aqueous colloidal solution. The now hydrophilic or more wettable substrate is then sensitized with a conventional sensitizer (non-wetting), e.g., a solution comprising $Sn^{+2}$ ions. The sensitized substrate is then activated by exposure to a suitable activating ion containing solution, e.g., a $PdCl_2$ solution. The activated substrate is then exposed to a conventional electroless metal deposition bath to deposit electroless metal thereon.

In a second embodiment of the present invention, a suitable substrate is first coated with a positive wetting-photopromoter solution comprising a positive photopromoter species, e.g., a tin, titanium, lead compound combined with the stable aqueous colloidal solution, formed by a hydrolysis and nucleation reaction, comprising insoluble hydrous oxide particles of one or more selected elements (the particles having a size within the range of 10 A. to 10,000 A. and the hydrolysis reaction including dissolution of a salt of the selected element in an aqueous medium and maintenance of the pH of the aqueous medium at a point where no flocculate results). Alternatively, where the positive photopromoter species is a hydrous oxide of an element selected from the group consisting of tin, titanium and lead, a colloidal photopromoter solution comprising insoluble particles thereof may be applied directly to the substrate.

The positive photopromoter-coated substrate is next selectively exposed to a source of short wavelength ultraviolet radiation to produce a pattern of the photopromoter capable of reducing a precious metal, e.g., Pd, from a precious metal salt, e.g., $PdCl_2$. The exposed substrate is then immersed in a solution comprising a salt of the precious metal to generate, by chemical reduction, a pattern of such precious metal. Ultimately, the precious metal pattern may be used as a catalyst to reduce thereon a metal, such as copper, for producing a metallic pattern in an autocatalytic electroless plating bath. The metallic pattern may be used as a circuit pattern of a circuit board.

In an alternative embodiment, the substrate, e.g., a hydrophobic organic polymer, is first rendered hydrophilic or more wettable by coating the substrate or a surface thereof with the stable aqueous colloidal solution, referred to above. The now hydrophilic or more wettable surface is then coated with a photopromoter comprising a photopromoter species (positive or negative), e.g., a tin, titanium, lead, iron, mercury compound. The photopromoter-coated substrate (positive or negative) is then photoselectively patterned with the ultraviolet radiation source and exposed to a salt of a precious metal to produce a precious metal-deposited pattern.

DESCRIPTION OF THE DRAWING

The present invention will be more readily understood by reference to the following drawing taken in conjunction with the detailed description, wherein.

DETAILED DESCRIPTION

Figure 1:
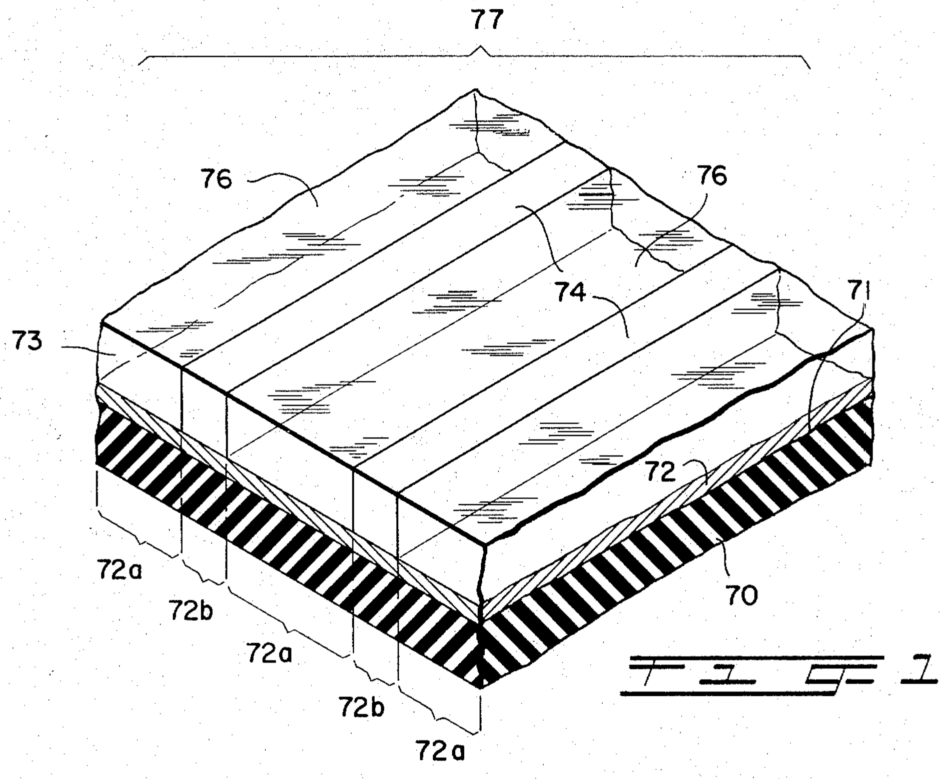
FIG. 1 is a partial isometric view of a portion of a typical substrate having a surface coated with a photopromoter layer of the present invention.

The present invention has been discussed primarily in terms of depositing Pd and Cu on a surface of a hydrophobic insulative substrate. It will be readily appreciated that the inventive concept is equally applicable to depositing other suitable metals, which are reduced from their respective ions by activating metals or precious metals (platinum group), e.g., Pd, Pt, Ag, Au, on a hydrophilic as well as on a hydrophobic surface.

A suitable substrate is selected. For the production of electrical circuit patterns, suitable substrates are those which are generally nonconductive. In general, all dielectric materials are suitable substrates. The substrate is sensitized by applying to a surface thereof a suitable sensitizer to form a sensitizer layer or coat. Sensitization consists of depositing or absorbing on the surface a sensitizing species, e.g., $Sn^{+2}$, $Ti^{+3}$, $Pb^{+2}$ ions, etc., which is readily oxidized. A suitable sensitizer is a wetting-sensitizer, i.e., is a solution comprising a conventional sensitizing species, e.g., $Sn^{+2}$, $Ti^{+3}$, $Pb^{+2}$ ions, which is well known in the art, combined with a suitable colloidal wetting solution. A suitable colloidal wetting solution includes at least one aqueous wetting solution revealed in Kenney, Ser. No. 8,022, filed Feb. 2, 1970 now U.S. Pat. No. 3,657,003, assigned to the assignee hereof and incorporated by reference herein. Such a wetting solution is generally described as a stable colloidal solution formed by a controlled hydrolysis and nucleation reaction in an aqueous medium wherein colloidal particles of the colloidal wetting solution (1) have a size within the range of 10 A. to 10,000 A. and (2) comprise an insoluble hydrous oxide of one or more selected elements. The term "hydrous oxide" is as defined in Kenney, referred to above, namely as an insoluble oxide, an insoluble hydroxide, an insoluble oxide-hydroxide, or an insoluble mixture of an oxide and a hydroxide( including all permutations and combinations of the oxides and/or hydroxides revealed in Kenney). The hydrolysis reaction includes dissolving a salt of the selected element in the aqueous medium and maintaining the pH of the aqueous medium at a point where no fluocculate results. Some suitable elements include Be, Mg, Ti, Zr, V, Cr, Mo, W, Mn, Fe, Co, Ni, Pd, Pt, Cu, Ag, Au, Zn, Cd, Hg, Al, In, Tl, Si, Ge, Sn, Pb, Bi, La, Ce, Th and U. Specifically, the wetting solutions include Examples I–A to XXXIII–L, inclusively, revealed in Kenney, referred to above.

The sensitizing species, e.g., $Sn^{+2}$, $Ti^{+3}$, etc., is combined with the suitable colloidal wetting solution in an amount ranging from a minimum concentration which adequately sensitizes a selected substrate surface to a maximum represented by saturation of the suitable colloidal wetting solution. It is, of course, to be understood that the concentration range is dependent on the particular sensitizing species, e.g., $Sn^{+2}$, and its corresponding compound, e.g., $SnCl_2 \cdot 2H_2O$, the degree of sensitization desired and the particular colloidal wetting solution selected. Such parameters, as adequate sensitization and concentrations of sensitizing species associated therewith, are well known in the art to one skilled therein or are easily ascertained experimentally by one skilled in the art.

It is to be noted that the wetting solutions revealed in Kenney and designated therein as Examples III–A, III–B,

XXVI–F, XXVI–G, XXVI–H, XXVII, XXXIII–A, XXXIII–B, XXXIII–C, XXXIII–D, XXXIII–E,

XXXIII–F,

XXXIII–G, XXXIII–H, XXXIII–I, XXXIII–J, XXXIII–K and XXXIII–L, comprise sensitizing species of $Sn^{+2}$, $Ti^{+3}$, and $Pb^{+2}$, in the form of a hydrous oxide, and can be applied directly on the substrate surface without addition thereto of other sensitizing species, e.g., $Sn^{+2}$ ions in the form of a tin halide to the non-stannous ion containing solution.

It is to be noted that alternatively, the substrate surface may be sensitized by first rendering the surface hydrophilic or more wettable by initially applying the suitable colloidal wetting solution thereto. A conventional sensitizer (non-wetting), e.g., a solution comprising the conventional sensitizing species $Sn^{+2}$ ions, is then applied to the hydrophilic or more wettable surface thereby obtaining a wetting-sensitization. This is an unexpected result since upon application of the colloid wetting solution to the surface, the surface is rendered positively charged (the colloid is positively charged) and ordinarily one would expect a repulsion of the positive sensitizing species, i.e., the $Sn^{+2}$, $Ti^{+3}$, $Pb^{+2}$ ions, etc.

The wetting-sensitizer or the conventional sensitizer (non-wetting is applied to the substrate surface using any one of a number of conventional techniques, e.g., dipping, spraying, brushing, etc., such techniques being well known in the art and not elaborated herein. In this regard, sensitizing procedures as well as conventional sensitizers may be found, in part, in Metallic Coating of Plastics, William Goldie, Electrochemical Publications, 1968.

It should be noted and stressed at this point, that unlike prior art electroless metal deposition methods, the substrate surface, destined to be sensitized, does not need to be pretreated or pickled, prior to sensitizing with the wetting-sensitizer or the alternate wetting-sensitization procedure of the present invention. Pretreatment or pickling refers to roughening (by mechanical means), etching, hydrolyzing, oxidizing (by chemical means) a surface of a hydrophobic substrate, e.g., a polyvinyl chloride surface, a polyimide surface, to improve wetting of that surface by conventional sensitizers (non-wetting), thereby leading to an ultimate improvement in adhesion of an electroless metal deposit thereto (with perhaps degradation of the surface properties and/or a loss in resolution). Such pickling is not needed, for the wetting-sensitizer or the wetting-sensitization of the present invention adequately wets a hydrophobic surface, e.g., a polyvinyl chloride surface, a polyimide surface, an epoxy surface, a polyolefin surface, etc., resulting in improved resolution and adhesion of an electroless metal deposit which is destined to be deposited on the hydrophobic surface.

After sensitizing the substrate surface, the sensitized surface is rinsed, then activated. It is to be noted that it is important that the sensitized surface be rinsed thoroughly in a cleaning medium, e.g., deionized water, after the sensitizing thereof. If such is not done, there is a possibility that reduction of an activating species, e.g., $Pd^{+2}$, to which the sensitized surface is destined to be exposed, will occur in non-adherent form on the surface. In this regard, it should be stressed that unlike other prior electroless metal depositon techniques whereby a sensitized pattern is obtained on the substrate surface, e.g., by stamping, printing, stenciling, etc., water rinsing of a wetting-sensitizer pattern does not cause a resultant blurred image.

Activation relates to providing a deposit of catalytic metal, e.g., noble metals such as Pd, Pt, Au, Ag, over areas of the sensitized surface, in sufficient quantity to successfully catalyze a plating reaction once the surface is introduced into an electroless plating bath. The sensitized surface so capable of reducing an activating metal, e.g., Pd, from an activating metal salt, e.g., $PdCl_2$ is exposed to the activating metal salt, e.g., $PdCl_2$, whereby the activating metal salt is reduced to the activating metal, e.g., Pd, which in turn is deposited thereon. The deposited activating metal, e.g., Pd, acts as a catalyst for localized further plating. It is to be understood that the various activating metal ions and their solutions (both aqueous and non-aqueous), the conditions and procedures of activation are well known in the art and will not be elaborated herein. Such activators and procedures may be found, in part, in Metallic Coating of Plastics, William Goldie, Electrochemical Publications, 1968. It is to be noted that aqueous wetting solutions revealed in Kenney and designated as Examples XIII–A, XIII–B, XIV, XVI, XVII–A, XVII–B and XVII–C comprise activating metal ions in the form of a hydrous oxide.

After activation, the activating metal-deposited substrate may be rinsed with water, typically for about one minute at 25° C., whereafter it is immersed in a standard electroless plating bath containing a metal ion, e.g., $Cu^{+2}$, destined to be catalytically reduced by using the catalytic activating metal species, e.g., Pd. The metal ion, e.g., $Cu^{+2}$, is catalytically reduced by a species contained in the electroless bath, e.g., formaldehyde, while in the presence of the activating metal, e.g., Pd, and is electrolessly deposited on the surface of the substrate to form an electroless metal deposit. It is to be pointed out that the electroless baths, the electroless plating conditions and procedures are well known in the art and will not be elaborated herein. Reference is again made to Metallic Coating of Plastics, for some typical examples of electroless baths and plating parameters.

Where it is desired to build up the electroless metal deposit, the electroless metal deposit is subjected to a conventional electroplating treatment whereby the electroless metal deposit is built up with either the same metal or a different metal, depending, of course, upon the application of the deposited pattern.

It is to be noted at this point that where selective metal deposition, on an insulative surface is desired, whereby a metal pattern is obtained, a standard substractive etching pattern generation technique, as typified by U.S. Pat. 3,011,920, may be employed. A preferable technique, however, is that revealed in D. J. Lando, Ser. No. 202,305, filed on Nov. 26, 1971, assigned to the assignee hereof and incorporated by reference herein, whereby the wetting-sensitizer can be applied to the substrate suface by means of stamping, e.g., by a rubber stamp, stenciling or printing.

In a second embodiment of the invention, referring to FIG. 1, there is shown a portion of a suitable nonconductive substrate 70. A suitable photopromoter is selected. A photopromoter is defined in De Angelo et al., U.S. Pat. 3,562,005, incorporated by reference herein, as a substance which, upon being exposed to appropriate energy, either (a) dissipates chemical energy already possessed thereby or (b) stores chemical energy not previously possessed thereby. When this substrate possesses or has stored chemical energy, it is capable of acting as a promoter which is a substance other than a catalyst which promotes or encourages a chemical reaction. A promoter differs from a catalyst in that the promoter does undergo a chemical change in performing its function.

A positive photopromoter is defined and discussed in De Angelo, referred to above, as being a photopromoter containing a metallic photopromoter species having two characteristics, namely, (1) an oxidation state or number which is alterable by exposure of the photopromoter species to radiation of the proper wavelength (short ultraviolet light of less than 3,000 A.); and (2) in its original state (but not in its altered state) the photopromoter species is capable of reducing a precious metal, e.g., palladium, from a solution containing a salt of the precious metal, e.g., a $PdCl_2$ solution.

A negative photopromoter is defined and discussed in U.S. Pat. 3,562,005, as being a photopromoter containing a metallic photopromoter species having two characteristics, namely, (1) an oxidation state or number which is alterable by exposure of the photopromoter species to radiation of the proper wavelength (short ultraviolet light of less than 3,000 A.), and (2) in its original state (but not in its altered state) the photopromoter species is not capable of reducing a precious metal, e.g., palladium, from a solution containing a salt of the precious metal, e.g., a $PdCl_2$ solution.

As pointed out in U.S. Pat. 3,562,005, suitable positive photopromoters are those containing the positive photopromoter species, $Sn^{+2}$, $Ti^{+3}$, $Pb^{+2}$ ions. Specifically, some suitable positive photopromoters are aqueous and organic solutions of tin, titanium or lead halides, e.g., $SnCl_2$, $SnBr_2$, $SnSo_4$, $TiCl_3$, $TiBr_3$, $PbCl_2$, $PbBr_2$. Generally, however, suitable positive photopromoter species are compounds of tin, titanium, and Pb, e.g., halides, nitrates, sulfates, oxylates, acetates, etc. Other suitable positive photopromoter species are hydrous oxides of tin, titanium and lead. Specifically, solutions comprising insoluble colloidal hydrous tin oxide particles, insoluble colloidal hydrous titanium oxide particles and insoluble colloidal hydrous lead oxide particles, where the particles have dimensions ranging from 10 A. to 10,000 A., are suitable positive photopromoters. These colloidal hydrous oxide positive photopromoter species are disclosed in Kenney, Ser. No. 8,022 now U.S. Pat. No. 3,657,003, previously referred to and incorporated by reference herein. More specifically, the solutions disclosed in Kenney and designated as Examples III–A, III–B, XXVI–F, XXVI–G, XXVI–H, XXVII, XXXIII–A, XXXIII–B, XXXIII–C, XXXIII–D, XXXIII–E, XXXIII–F, XXXIII–G, XXXIII–H, XXXIII–I, XXXIII——, and XXXIII–K, are suitable positive photopromoters, incorporated herein by reference.

Suitable negative photopromoters are those containing the negative photopromoter species, $Fe^{+3}$, $Hg^{+2}$ ions. Specifically, some suitable negative photopromoters are solutions of metal salts including ferric oxalate, ferric citrate, ferric tartarate, mercuric oxalate, mercuric citrate and mercuric tartrate.

A suitable wetting solution is combined with the suitable photopromoter species, e.g., $Sn^{+2}$, $Ti^{+3}$, $Pb^{+2}$, compound or solution, to form a positive wetting-photopromoter solution. As discussed previously, the suitable wetting solution includes at least one wetting solution of Kenney, Ser. No. 8,022 now U.S. Pat. No. 3,657,003, previously referred to. The resultant positive wetting-photopromoter solution is applied to a surface 71 of the substrate 70, utilizing procedures revealed in U.S. Pat. 3,562,005, or formed thereon, whereby layer or coat 72 is established.

It is to be noted that where the positive photopromoter species comprises any of the hydrous oxide particles of tin, titanium or lead, then colloidal solutions thereof (Kenney Examples III–A, III–B, XXVI–F to XXVI–H, XXVII, XXXIII–A to XXXIII–K) can be applied directly on the surface 71 without any addition thereto of other positive photopromoter species, e.g., $Sn^{+2}$ ions in the form of a tin halide.

It is also to be noted that the photopromoter layer 72 which is established above, is a positive photopromoter layer since a positive wetting-photopromoter is employed, however, such need not be the case where a two solution process is employed. The photopromoter layer 72, which may comprise a positive photopromoter species or a negative photopromoter species, can be established on the surface 71 of the substrate 70 by first rendering the surface 71 hydrophilic or more wettable. Specifically, the surface 71 is first treated or coated with a first solution comprising at least one of the colloidal wetting solutions of Kenney, referred to above, to render that surface hydrophilic or more wettable. A suitable positive or negative photopromoter species containing solution (non-wetting), e.g., a $Sn^{+2}$, $Ti^{+3}$, $Pb^{+2}$, $Fe^{+3}$, $Hg^{+2}$ containing solution, is then applied to the now hydrophilic or more wettable surface 71 to form the photopromoter layer or coat 72.

Again it is to be noted and stressed that establishing a photopromoter layer 72 by this two solution procedure is unexpected. As pointed out previously, upon applying the positively charged colloid wetting solution revealed in Kenney, referred to above, to the surface 71, the surface 71 becomes positively charged. One would then expect a repulsion of like charges when the photopromoter solution is applied to the now colloid treated surface 71, since the photopromoter solution, i.e., the photopromoter species thereof, e.g., $Fe^{+3}$, $Sn^{+2}$, etc., is also positively charged. Such a repulsion does not occur as evidenced by the establishment of layer 72.

A suitable mask 73 is then placed contiguous to the photopromoter layer 72 (positive or negative). Where a positive wetting-photopromoter solution is employed or where a positive photopromoter layer 72 is established (two solution process), the mask 73 is a positive mask which has areas 74 which are opaque to the desired radiation to which the positive mask 73 is destined to be exposed. The positive mask 73 has areas 76 which are capable of transmitting therethrough the desired radiation to which the positive mask 73 is destined to be exposed. Where a negative photopromoter layer 72 is established (two solution process), the mask 73 is a negative mask and areas 74 thereof are now capable of transmitting the desired radiation while areas 76 thereof are now opaque thereto. It should be noted that in the alternative, separate masking areas may be applied to layer 72, utilizing standard materials and techniques known in the art.

A radiation source 77, e.g., an ultraviolet radiation source having a wavelength ranging from 1,800 A. to 2,900 A., is placed above the mask 73 and directed thereat. Where a positive wetting-photopromoter solution, e.g., $Sn^{+2}$, $Ti^{+3}$, $Pb^{+2}$, photopromoter species containing or a positive photopromoter layer 72 is established (two solution process) and a positive mask 73 is employed, a plurality of rays having a wavelength ranging from 1,800 A. to 2,900 A. passes through or is transmitted through areas 76 of the mask 73 to expose areas 72*a* of the positive photopromoter-coated layer 72 thereto. The thus exposed areas 72*a* of layer 72, underlying and corresponding to areas 76 of the positive mask 73, are incapable of reducing a precious metal ion, e.g., $Pd^{+2}$, to a precious metal, e.g., Pd, from a precious metal salt, e.g., $PdCl_2$, contained in a solution (aqueous or non-aqueous) to which the radiation-exposed substrate 70 is destined to be exposed. The explanation for this is, that the positive photopromoter species comprising $Sn^{+2}$ ions, $Ti^{+3}$ ions, $Pb^{+2}$ ions, e.g., hydrous oxides of tin, titanium, lead, upon exposure to suitable radiation (having a wavelength in the range of 1,800 A. to 2,900 A.) absorbs the energy therefrom and the positive photopromoter species resulting from the radiation energy absorption is not capable of reducing the precious metal ion to the precious metal. The remaining areas 72*b* of the positive photopromoter layer 72, corresponding to areas 74 of the positive mask 73, which have not been exposed to the desired radiation still possess the ability to reduce the precious metal ion to the precious metal from the precious metal salt. A pattern or outline, delineated by ultraviolet radiation exposure, which is capable of reducing a precious metal from a salt thereof is thus established.

Where a negative photopromoter layer 72, established by the two solution process (the colloidal wetting solution and the non-wetting negative photopromoter solution, e.g., $Fe^{+3}$, $Hg^{+2}$, photopromoter species containing), and a negative mask 73 is employed, a plurality of rays, having a wavelength ranging from 1,800 A. to 2,900 A., passes through or is transmitted through areas 74 of the mask 73 to expose areas 72*b* of the negative photopromoter-coated layer 72 thereto. The thus exposed areas 72*b* of layer 72, underlying and corresponding to areas 74 of the negative mask are capable of reducing a precious metal ion, e.g., $Pd^{+2}$, to a precious metal, e.g., Pd, from a precious metal salt, e.g., $PdCl_2$, contained in a bath to which the radiation-exposed substrate 70 is destined to be exposed. The explanation for this is that the negative photopromoter species, comprising $Fe^{+3}$ ions or $Hg^{+2}$ ions, upon exposure to suitable radiation (having a wavelength in the range of 1,800 A. to 2,900 A.) absorbs the energy therefrom and the negative photopromoter species resulting from the radiation energy absorption is now capable of reducing the precious metal ion to the precious metal. The remaining areas 72*a* of the negative photopromoter layer 72, corresponding to areas 76 of the negative mask 73, which have not been exposed to the desired radiation do not possess the ability to reduce the precious metal ion to the precious metal from the precious metal salt. A pattern or outline, delineated by ultraviolet radiation exposure, which is capable of reducing a precious metal from a salt thereof is thus established.

Figure 2:
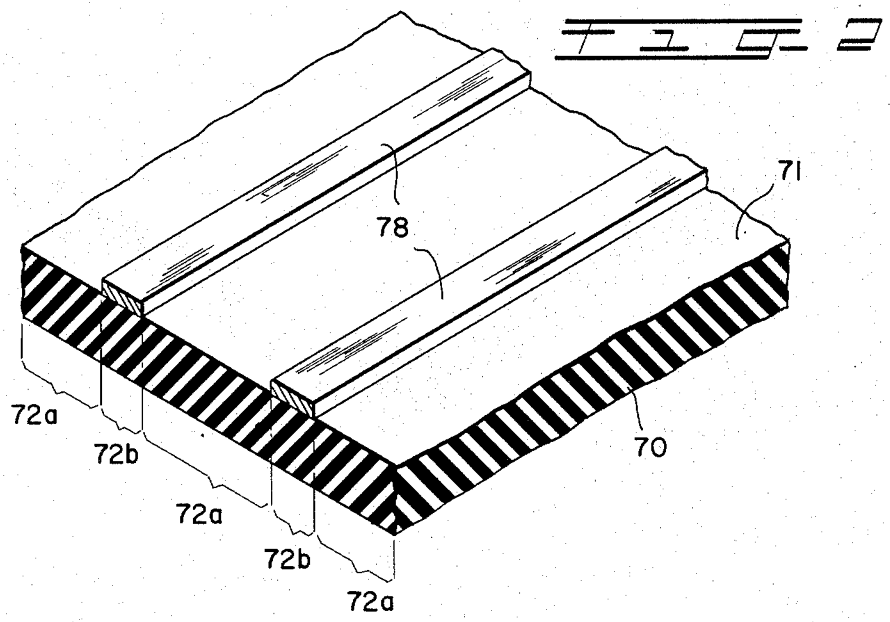
FIG. 2 is a partial isometric view of the portion of the substrate of FIG. 1 after a metallic pattern has been photoselectively deposited thereon by the novel method of the present invention.

As described in U.S. Pat. 3,562,005, previously referred to, the radiation exposed substrate 70 is immersed in a precious metal ion containing solution (aqueous or nonaqueous), e.g., ions of the metals Pd, Pt, Ru, Au and Ag, wherein the precious metal ion is reduced to the precious metal and deposited on areas 72*b* of the substrate 70. It is to be noted that the resultant precious metal deposit, deposited in a pattern, i.e., on areas 72*b* of the substrate 70, may not always be visible to the naked eye but is certainly visible with electronic instruments such as an electron microscope, electron microprobe, etc. The precious metal-deposited substrate 70 may then be immersed in a conventional electroless metal plating bath, e.g., a copper plating bath, wherein an electroless metal deposition 78 on the substrate 70 occurs as shown in FIG. 2. The electroless metal deposition 78 may then be further built up or electroplated in a standard electroplating bath.

Again, it is to be noted that the various electroless and electroplating solutions, plating conditions and procedures are well known in the art and will not be elaborated herein. Reference is again made to Metallic Coating of Plastics for some typical examples of both electroless and electroplating baths and plating parameters.

EXAMPLE I (A) A wetting-sensitizer was prepared by dissolving ½ weight percent of beryllium chloride in 100 ml. of deionized water. The initial pH of 3.0 of the resultant solution was raised to 5.6–5.8 by adding dilute $NH_4OH$. To the resultant solution was added 0.5 weight percent $SnCl_2 \cdot 2H_2O$ to obtain a wetting-sensitizer. A polyimide substrate, commercially obtained, was coated by the wetting-sensitizer by immersion therein. The resultant sensitized substrate was then immersed in an aqueous activating solution comprising 0.05 weight percent $PdCl_2$. The activated substrate was then immersed in a commercially obtained electroless copper plating bath, comprising copper sulfate, formaldehyde, complexer and caustic, wherein an electroless copper deposit having a thickness of twenty microinches was obtained. The resultant electroless copper deposit was immersed in a conventional copper electroplating bath, commercially obtained, and a copper deposit having a thickness of 1.0 mil was obtained.

(B) The procedure of Example I–(A) was repeated except that the wetting-sensitizer employed was prepared by dissolving one weight percent of beryllium chloride [$BeCl_2$] in 100 ml. of deionized water. To the resultant solution was added 0.2 weight percent $SnCl_2 \cdot 2H_2O$. The initial pH was raised with NaOH until it was 5. A 1.0 mil thick copper deposit was obtained.

(C) The procedure of Example I–(B) was repeated except that 1.0 weight percent $SnCl_2 \cdot 2H_2O$ was employed. A 1.0 mil thick copper deposit was obtained.

(D) The procedure of Example I–(A) was repeated except that the wetting-sensitizer employed was prepared by first preparing a 0.25 weight percent aqueous beryllium chloride [$BeCl_2$] solution. The solution was heated for one hour at 70° C. to obtain a wetting solution. To the wetting solution was added 0.2 weight percent of $SnCl_2 \cdot 2H_2O$. A 1.0 mil thick copper deposit was obtained.

(E) The procedure of Example I–(D) was repeated except that the wetting-sensitizer solution comprised 0.50 weight percent of beryllium chloride [$BeCl_2$]. A 1.0 mil thick copper deposit was obtained.

(F) The procedure of Example I–(D) was repeated except that the wetting-sensitizer solution comprised 2.0 weight percent of $SnCl_2 \cdot 2H_2O$. A 1.0 mil thick copper deposit was obtained.

(G) The procedure of Example I–(E) was repeated except that the wetting-sensitizer solution comprised 2.0 weight percent of $SnCl_2 \cdot 2H_2O$. A 1.0 mil thick copper deposit was obtained.

(H) The procedure of Example I–(A) was repeated except that the wetting-sensitizer employed was prepared by first dissolving one weight percent of magnesium chloride [$MgCl_2$ or $MgCl_2 \cdot 6H_2O$] in 100 ml. of deionized water. Added to the solution was 0.5 weight percent of $SnCl_2 \cdot 2H_2O$. The pH of the resultant solution was then raised to 5.5 whereby the wetting-sensitizer was obtained. A 1.0 mil thick copper deposit was obtained.

(I) The procedure of Example I–(A) was repeated except that the wetting-sensitizer employed was prepared by first dissolving one weight percent of magnesium nitrate [$Mg(NO_3)_2 \cdot 6H_2O$] in 100 ml. of deionized water. One weight percent of $SnCl_2 \cdot 2H_2O$ was added thereto and the pH of the resultant solution was raised to 5 with NaOH. A 1.0 ml. thick copper deposit was obtained.

(J) The procedure of Example I–(A) was repeated except that the wetting-sensitizer employed was that revealed in Kenney, referred to above, and designated therein as Example III–A. Specifically, the wetting-sensitizer was prepared by adding particulated titanium metal [Ti°] to a hot or boiling (about 80° C.) concentrated HCl, until 0.2–3 weight percent of the titanium was dissolved. The resultant solution was cooled to room temperature and the pH was raised with NaOH to 1.0–1.5 A. 1.0 mil thick copper deposit was obtained.

(K) The procedure of Example I–(A) was repeated except that the wetting-sensitizer employed was that revealed in Kenney, referred to above, designated as Example III–B. Specifically, the wetting-sensitizer was prepared by adding particulated titanium metal [Ti°] to hot or boiling (about 80° C. $HNO_3$, until 0.2–3 weight percent of the titanium was dissolved. The solution was cooled to 25° C. and the pH slowly raised with NaOH to about 1.0–1.5. A 1.0 mil thick copper deposit was obtained.

(L) The procedure of Example I–(K) was repeated except that in preparing the solution, prior to raising the pH thereof, sufficient $H_2O_2$ was added quantitatively to render all the dissolved titanium [$Ti^{+3}$] to $Ti^{+4}$. The pH was then raised with NaOH to 1.2–2.0 and 0.2 weight percent of $SnCl_2 \cdot 2H_2O$ was added thereto to obtain the wetting-sensitizer solution. A 1.0 mil thick copper deposit was obtained.

(M) The procedure of Example I–(L) was repeated except that 2.0 weight percent of $SnCl_2 \cdot 2H_2O$ was added. A 1.0 mil thick copper deposit was obtained.

(N) The procedure of Examhple I–(A) was repeated except that the wetting-sensitizer employed was prepared by adding $TiCl_3$ to HCl acid, diluted with deionized water until one weight percent of the $TiCl_3$ dissolved. The initial pH was raised to about 10 with NaOH to produce a wetting solution. Added to the wetting solution was 0.2 weight percent of $SnCl_2 \cdot 2H_2O$ to obtain the wetting-sensitizer. A 1.0 mil thick copper deposit was obtained.

(O) The procedure of Example I–(N) was repeated except that 2.0 weight percent of $SnCl_2 \cdot 2H_2O$ was added. A 1.0 mil thick copper deposit was obtained.

(P) The procedure of Example I–(A) was repeated except that the wetting-sensitizer employed was prepared by adding one gram of fused titanium [Ti°] to 70 ml. of concentrated HCl. The resultant solution was boiled until a blue-purple solution was obtained. The pH of the blue-purple solution was then raised to 0.5 with 1 N NaOH. Diluted 50 weight percent $H_2O_2$ was added thereto in slight excess until a colorless wetting solution resulted. To the wetting solution was added 0.2 weight percent $SnCl_2 \cdot 2H_2O$ to obtain the wetting-sensitizer solution. A 1.0 mil thick copper deposit was obtained.

(Q) The procedure of Example I–(P) was repeated except that 4.0 weight percent of $SnCl_2 \cdot 2H_2O$ was added. A 1.0 mil thick copper deposit was obtained.

(R) The procedure of Example I–(A) was repeated except that the wetting-sensitizer employed was prepared by dissolving one weight percent of zirconyl chloride [$ZrOCl_2 \cdot 8H_2O$] in 100 ml. of deionized water. The pH of the resultant solution was adjusted to 1.4–2 by adding NaOH thereto, whereupon 0.2 weight percent of $SnCl_2 \cdot 2H_2O$ was dissolved in the resulting wetting solution to obtain the wetting-sensitizer. A 1.0 mil thick copper deposit was obtained.

(S) The procedure of Example I–(R) was repeated except that 2.0 weight percent of $SnCl_2 \cdot 2H_2O$ was dissolved. A 1.0 mil thick copper deposit was obtained.

(T) The procedure of Example I–(A) was repeated except that the wetting-sensitizer employed was prepared by dissolving one weight percent of vanadium metal [V°] in 100 ml. of boiling $HNO_3$. The pH of the resultant solution was raised to 1.5–2 with NaOH. The solution was then heated and a small amount of $H_2O_2$ was added thereto to yield a red-brown wetting solution. The $H_2O_2$ remaining was boiled off and the solution was cooled to 25° C. To the cooled solution was added 0.5 weight percent of $SnCl_2 \cdot 2H_2O$ to obtain the wetting-sensitizer. A 1.0 mil thick copper deposit was obtained.

(U) The procedure of Example I–(A) was repeated except that the wetting-sensitizer employed was prepared by dissolving one weight percent of sodium vanadate [$NaVO_3$] in 100 ml. of deionized water. HCl was then added to the resultant solution to charge the pH to 1.5. Dissolved in the resultant solution was 0.5 weight percent of $SnCl_2 \cdot 2H_2O$ to obtain the wetting-sensitizer. A 1.0 mil thick copper deposit was obtained.

(V) The procedure of Example I–(A) was repeated except that the wetting-sensitizer employed was prepared by dissolving 0.5 weight percent of a green chromic chloride [$CrCl_3 \cdot 6H_2O$) or $(Cr(H_2O)_4CL_2)\ Cl \cdot 2H_2O$ or $(Cr(H_2O)_5Cl)Cl_2 \cdot H_2O$] in 100 ml. of deionized water. To the resultant solution was added 0.1 weight percent $SnCl_2 \cdot 2H_2O$ to obtain the wetting-sensitizer. A 1.0 mil thick copper deposit was obtained.

(W) The procedure of Example I–(A) was repeated except that the wetting-sensitizer employed was prepared by dissolving one weight percent of a sodium molybdate [which may be $Na_2MoO_4 \cdot 2H_2O$ or $$Na_4(6MO_7O_{24}) \cdot 4H_2O]$$

in 100 ml. of deionized water. The pH of the resultant solution was lowered to 4 by adding HCl thereto whereupon one weight percent $SnCl_2 \cdot 2H_2O$ was added to obtain the wetting-sensitizer. A 1.0 mil thick copper deposit was obtained.

(X) The procedure of Example I–(A) was repeated except that the wetting-sensitizer employed was prepared by dissolving 1–5 weight percent of sodium tungstate dihydrate [$Na_2WO_4 \cdot 2H_2O$] in 100 ml. of deionized water. The pH of the resultant solution was lowered to less than 2 by adding HCl thereto. Added to the resultant solution was 0.5 weight percent $SnCl_2 \cdot 2H_2O$ to obtain the wetting-sensitizer solution. A 1.0 mil thick copper deposit was obtained.

(Y) The procedure of Example I–(A) was repeated except that the wetting-sensitizer employed was prepared by dissolving one weight percent of manganese trichloride [$MnCl_3$] in sufficient HCl to produce a solution having a pH of 0.5–2. Excess $H_2O_2$ was then added and the resultant solution heated. The pH was then raised to 0.6–8 by adding NaOH whereupon 0.5 weight percent $SnCl_2 \cdot 2H_2O$ was added to obtain the wetting-sensitizer. A 1.0 mil thick copper deposit was obtained.

(Z) The procedure of Example I–(A) was repeated except that the wetting-sensitizer employed was prepared by dissolving one weight percent of ferric chloride $$[FeCl_3 \cdot 6H_2O]$$

in 100 ml. of deionized water [dissolution was aided by heating to 50° to 80° C. and stirring]. The resultant wetting solution was cooled to 25° C. and added thereto was 0.2 weight percent of $$SnCl_2 \cdot 2H_2O$$

to obtain the wetting-sensitizer. A 1.0 mil thick copper deposit was obtained.

(AA) The procedure of Example I–(Z) was repeated except that 2 weight percent of $SnCl_2 \cdot 2H_2O$ was added. A 1.0 mil thick copper deposit was obtained.

(BB) The procedure of Example I–(A) was repeated except that the wetting-sensitizer employed was prepared by dissolving 0.5 weight percent of ferric chloride $$[FeCl_3 \cdot 6H_2O]$$

in 100 ml. of deionized water. The pH was adjusted to 1.5–2.0 by adding HCl and the solution heated to 70° C. within 20 minutes resulting in a coffee-pumpkin wetting solution. To the wetting solution was added 0.1 weight percent $SnCl_2 \cdot 2H_2O$ to obtain the wetting-sensitizer. A 1.0 mil thick copper deposit was obtained.

(CC) The procedure of Example I–(BB) was repeated except that 2.0 weight percent of $SnCl_2 \cdot 2H_2O$ was added. A 1.0 mil thick copper deposit was obtained.

(DD) The procedure of Example I–(A) was repeated except that the wetting-sensitizer employed was prepared by dispersing 1.5 weight percent of ferric chloride $$[FeCl_3 \cdot 6H_2O]$$

in 100 ml. of deionized water to a final pH of 1.7–1.9. The solution was allowed to stand in ambient for one week to obtain a coffee-pumpkin color wetting solution. To the wetting solution was added 0.1 weight percent $SnCl_2 \cdot 2H_2O$ to obtain the wetting-sensitizer. A 1.0 mil thick copper deposit was obtained.

(EE) The procedure of Example I–(DD) was repeated except that 2.0 weight percent of $SnCl_2 \cdot 2H_2O$ was added. A 1.0 mil thick copper deposit was obtained.

(FF) The procedure of Example I–(A) was repeated except that the wetting-sensitizer employed was prepared by dissolving 0.5 weight percent of a ferric nitrate $$[Fe(NO_3)_2 \cdot 6H_2O \text{ or } FE(NO_3)_3 \cdot 6H_2O$$

or $Fe(NO_3)_3 \cdot 9H_2O$] in 100 ml. of deionized water. HCl was then added to adjust the pH to 1.5–2.0. The solution was then heated to 70° C. within 20 minutes resulting in a coffee-pumpkin colored wetting solution. To the wetting solution was added 0.1 weight percent $SnCl_2 \cdot 2H_2O$ to obtain the wetting-sensitizer. A 1.0 mil thick copper deposit was obtained.

(GG) The procedure of Example I–(FF) was repeated except that 2.0 weight percent of $SnCl_2 \cdot 2H_2O$ was added. A 1.0 mil thick copper deposit was obtained.

(HH) The procedure of Example I–(A) was repeated except that the wetting-sensitizer employed was prepared by first heating 100 ml. of deionized water to 70° C. ½–5 weight percent of ferric chloride [$FeCl_3 \cdot 6H_2O$] was added thereto and dissolved therein to give a green wetting solution having a pH of 1.5–2.0. To the wetting solution was added 0.1 weight percent $SnCl \cdot 2HO$ to obtain the wetting-sensitizer. A 1.0 mil thick copper deposit was obtained.

(II) The procedure of Example I–(HH) was repeated except that 2.0 weight percent of $SnCl_2 \cdot 2H_2O$ was added. A 1.0 mil thick copper deposit was obtained.

(JJ) The procedure of Example I–(HH) was repeated except that ferric nitrate [$Fe(NO_3)_3 \cdot 6H_2O$] was employed. A 1.0 mil thick copper deposit was obtained.

(KK) The procedure of Example I–(II) was repeated except that ferric nitrate [$Fe(NO_3)_3 \cdot 6H_2O$] was employed. A 1.0 mil thick copper deposit was obtained.

(LL) The procedure of Example I–(A) was repeated except that the wetting-sensitizer employed was prepared by adding one percent of particulated ferric oxalate [$Fe_2(C_2O_4)_3$], having a particle size of 150 A., to 100 ml. of deionized water. The solution was ultrasonically agitated to aid dissolution and the pH of the solution was lowered from 3–3.5 to a pH of 1.0 with HCl. To the resultant wetting solution was added 0.5 weight percent of $SnCl_2 \cdot 2H_2O$ to obtain the wetting-sensitizer. A 1.0 mil thick copper deposit was obtained.

(MM) The procedure of Example I–(A) was repeated except that the wetting-sensitizer employed was prepared by adding one weight percent of cobaltous chloride [$CoCl_2 \cdot 6H_2O$] to 100 ml. of deionized water to form a rose colored solution having a pH of about 4.9–5.1. To the solution was added one weight percent $SnCl_2 \cdot 2H_2O$ to form a solution having a pH of 1.5. The pH was then raised to 7.0–7.2 by adding NaOH thereby resulting in the wetting-sensitizer. A 1.0 mil thick copper deposit was obtained.

(NN) The procedure of Example I–(A) was repeated except that the wetting-sensitizer employed was prepared by adding one weight percent of cobaltous chloride [$CoCl_2 \cdot 6H_2O$] to 100 ml. of deionized water. Sufficient NaOH was then added to effect the onset of a Tyndal cone. The solution was then heated to about 60°–70° C. for two days, the pH being adjusted, as necessary, with NaOH to about 4. To the resultant wetting solution was added one weight percent $SnCl_2 \cdot 2H_2O$ to obtain the wetting-sensitizer. A 1.0 mil thick copper deposit was obtained.

(OO) The procedure of Example I–(A) was repeated except that the wetting-sensitizer employed was prepared by adding one weight percent of cobaltous chloride [$CoCl_2 \cdot 6H_2O$] to 100 ml. of deionized water. The solution was heated to about 60°–70° C. and was constantly stirred. During the constant stirring the pH was raised to about 2 with NaOH. The solution was again heated and the pH again raised to about 2 with NaOH. This procedure was continued until the onset of a Tyndal cone, i.e., for about 6 hours. To the resulting wetting solution was added 0.5 weight percent of $SnCl_2 \cdot 2H_2O$ to obtain the wetting-sensitizer. A 1.0 mil thick copper deposit was obtained.

(PP) The procedure of Example I–(A) was repeated except that the wetting-sensitizer employed was prepared by dissolving one weight percent of nickel chloride [$NiCl_2 \cdot 6H_2O$] in deionized water. HCl was added to the solution to give a pH of 2.0. Added to the resultant solution was one weight percent of $SnCl_2 \cdot 2H_2O$ to obtain the wetting-sensitizer. A 1.0 mil thick copper deposit was obtained.

(QQ) The procedure of Example I–(A) was repeated except that the wetting-sensitizer employed was prepared by dissolving one weight percent of cupric chloride [$CuCl_2$] in 100 ml. of deionized water. HCl was then added thereto to a pH of 2.0. To the resultant solution was added one weight percent of $SnCl_2 \cdot 2H_2O$ to obtain the wetting-sensitizer. A 1.0 mil thick copper deposit was obtained.

(RR) A hydrous palladium oxide solution revealed in Kenney, referred to above, and designated therein as Example XIII–A, functions as a one-step sensitizer-activator. Specifically, a hydrous palladium oxide wetting solution was prepared by adding one weight percent of palladium chloride [$PdCl_2$] in 100 ml. of deionized water. The mixture was stirred until the maximum amount of $PdCl_2$ was dissolved. The final pH of the solution was about 2.7. A resultant dark murky-brown wetting, one-step sensitizer-activator solution was obtained.

A polytetrafluoroethylene substrate, commercially obtained, was first immersed in the wetting palladium solution. The substrate was then rinsed in water and then immersed in a commercial electroless copper bath comprising copper sulfate, formaldehyde, complexer, and caustic wherein the $Pd^{+2}$ ions were reduced to Pd° which in turn catalyzed the reduction of $Cu^{+2}$ ions to Cu°. A 20 microinch electroless copper deposit was obtained.

(SS) The procedure of Example I–(RR) was repeated except that the hydrous palladium oxide solution was that revealed in Kenney, referred to above, designated therein as Example XIII–B. Specifically, the solution was prepared by adding 10 ml. of a 5 weight percent aqueous $PdCl_2$ solution to 100 ml. of deionized water. The initial pH of this solution was raised to 3.0–3.2 with 1 N NaOH thereby resulting in a wetting, one-step sensitizer-activator solution. A 20 microinch electroless copper deposit was obtained.

(TT) A hydrous platinum oxide solution, revealed in Kenney, referred to above, and designated therein as Example XIV, functions as a wetting, one-step sensitizer-activator. Specifically, a hydrous platinum oxide wetting solution was prepared by dissolving one weight percent of platinous dichloride [$PtCl_2$] in 100 ml. of hot (70° C.), dilute HCl. After cooling to room temperature the pH of this solution was raised to about 3 with equal parts of $NH_4OH$ and NaOH (both 1 N), thereby resulting in the wetting, one-step sensitizer-activator platinum solution.

An epoxy substrate, commercially obtained, was first immersed in the wetting platinum solution. The substrate was then immersed in a commercial electroless copper bath, comprising copper sulfate, formaldehyde, complexer and caustic, wherein the $Pt^{+2}$ ions were reduced to Pt° which in turn catalyst the reduction of $Cu^{+2}$ ions to Cu°. A 20 microinch electroless copper deposit was obtained.

(UU) A hydrous silver oxide solution, revealed in Kenney, referred to above, and designated therein as Example XVI functions as a wetting, one-step sensitizer-activator. Specifically, a hydrous silver oxide wetting solution was prepared by dissolving 0.25 to 0.50 weight percent of silver nitrate [$AgNo_3$] in 100 ml. of deionized water. The pH of this solution was rapidly raised to a pH of 7 with NaOH. The pH was slowly raised with NaOH to within the range of 8–9 to obtain the wetting, one-step sensitizer-activator solution.

An epoxy substrate, commercially obtained, was first immersed in the wetting silver solution. The substrate was then immersed in a commercial electroless copper bath, comprising copper sulfate, formaldehyde, complexer and caustic, wherein the $Ag^+$ ions were reduced to Ag° which in turn catalyzed the reduction of $Cu^{+2}$ ions to Cu°. A 20 microinch electroless copper deposit was obtained on the substrate.

(VV) The procedure of Example I–(UU) was repeated except that the silver nitrate was dissolved in 100 ml. of 50 volume percent deionized water and 50 volume percent of ethyl alcohol. A 20 microinch electroless copper deposit was obtained on the substrate.

(WW) A hydrous gold oxide solution, revealed in Kenney, referred to above, and designated therein as Example XVII–A functions as a wetting, one-step sensitizer-activator. Specifically, one weight percent of auric chloride [$AuCl_3$] was dissolved in 100 ml. of a deionized $H_2O$ to produce a yellow solution, the pH of which was slowly raised (e.g., over a period of 2 days) to about 4–5 with a mixture of 1 N $NH_4OH$ and 1 N NaOH (equal parts of each). During the raising of the pH, the solution was continuously stirred and was slightly heated to about 30°–40° C. A brown wetting solution was obtained which functions as a one-step sensitizer-activator.

A polyester substrate, commercially obtained, was first immersed in the wetting gold solution. The substrate was then immersed in a commercial electroless copper bath, comprising copper sulfate, formaldehyde complexer and caustic, wherein the $Au^{+3}$ ions were reduced to Au° which in turn catalyzed the reduction of $Cu^{+2}$ ions to Cu°. A 20 microinch electroless copper deposit was obtained on the substrate.

(XX) The procedure of Example I–(WW) was employed, except that the hydrous gold oxide solution was that revealed in Kenney, referred to previously, designated therein as Example XVII–B, which was prepared by dissolving ½–1 weight percent of $AuCl_3$ in 100 ml. of deionized water. The $H_2O$ and HCl in the solution was permitted to evaporate in ambient slowly over a period of 2–4 weeks (or at reduced pressure for a shorter time), until about ⅕ of the volume of the original solution remained. A golden yellow wetting solution was obtained. A 20 microinch electroless copper deposit was obtained on the substrate.

(YY) The procedure of Example I–(WW) was repeated, except that the hydrous gold oxide solution was that revealed in Kenney, referred to previously, designated therein as Example XVII–C. Specifically, one weight percent of auric chloride [$AuCl_3$] was dissolved in 100 ml. deionized $H_2O$. The pH of this solution was raised very slowly with NaOH to about 4 where the solution became a cloudy brown wetting solution. A 20 microinch electroless copper deposit was obtained.

(ZZ) The procedure of Example I–(A) was repeated except that the wetting-sensitizer employed was prepared by dissolving one weight percent of zinc chloride [$ZnCl_2$] in 100 ml. of deionized water. HCl was then added to lower the pH to 2.0 and one weight percent of $SnCl_2.2H_2O$ was added to the resultant solution. Finally, 1 N NaOH was added to raise the pH to 4.5 whereby the wetting-sensitizer was obtained. A 1.0 mil thick copper deposit was obtained.

($A^1$) The procedure of Example I–(A) was repeated except that the wetting-sensitizer employed was prepared by dissolving one weight percent of cadmium chloride [$CdCl_2.2\frac{1}{2}H_2O$] in 100 ml. of deionized water. $NH_4OH$ was then added until the onset of a Tyndal cone at a pH of 6.8–7.0. At this point, one weight percent of $SnCl_2.2H_2O$ (dissolved in as small amount as possible of an HCl solution at a pH of 1) was added to the resultant solution whereby the wetting-sensitizer was obtained. A 1.0 mil thick copper deposit was obtained.

($B^1$) The procedure of Example I–(A) was repeated except that the wetting-sensitizer employed was prepared by dissolving one weight percent of mercuric chloride (corrosive sublimate) [$HgCl_2$] in 100 ml. of deionized water. Dilute NaOH was then added to the solution to raise the pH to about 5. The solution was then stirred until a vaguely yellow wetting solution was obtained. To the wetting solution was added one weight percent $$SnCl_2.2H_2O$$

thereby resulting in the wetting-sensitizer. A 1.0 mil thick copper deposit was obtained.

($C^1$) The procedure of Example I–(A) was repeated except that the wetting-sensitizer employed was prepared by adding one weight percent of finely powdered aluminum chloride [$AlCl_3$] to 100 ml. of deionized water. NaOH was then added to raise the pH to about 5.2. The resultant solution was then heated for about 2 hours at about 60°–80° C. to obtain a wetting solution. The wetting solution was cooled to 25° C. and one weight percent of $SnCl_2\cdot 2H_2O$ was added thereto to obtain the wetting-sensitizer. A 1.0 mil thick copper deposit was obtained.

($D^1$) The procedure of Example I–(A) was repeated except that the wetting-sensitizer employed was prepared by heating 100 ml. of deionized water to about 60° C. One weight percent of $AlCl_3\cdot 6H_2O$ was then added thereto. The initial pH (2.5) was raised to about 5.0–5.2 while the solution was still hot by adding 1 N NaOH thereby resulting in a cloudy white wetting solution. The wetting solution was cooled to 25° C. and one weight percent of $SnCl_2\cdot 2H_2O$ was added thereto to obtain the wetting-sensitizer. A 1.0 mil thick copper deposit was obtained.

($E^1$) The procedure of Example I–(A) was repeated except that the wetting-sensitizer employed was prepared by dissolving one weight percent of indium trichloride [$InCl_3$] in 100 ml. of deionized water. The pH of this solution was raised to about 3 with NaOH to give a wetting solution. To the wetting solution was added one weight percent of $SnCl_2\cdot 2H_2O$ to obtain the wetting-sensitizer. A 1.0 mil thick copper deposit was obtained.

($F^1$) The procedure of Example I–(A) was repeated except that the wetting-sensitizer employed was prepared by dissolving 0.5 weight percent of indium monochloride [InCl] in 100 ml. of deionized water. The precipitate that appeared was filtered off and the initial pH (3.5) of the resulting solution was raised slowly (by dropwise addition) with very dilute (factor of 20 with $H_2O$) $NH_4OH$ to a pH of about 3.9 to give a wetting solution. To the wetting solution was added one weight percent $SnCl_2\cdot 2H_2O$ to obtain the wetting-sensitizer. A 1.0 mil thick copper deposit was obtained.

($G^1$) The procedure of Example I–(A) was repeated except that the wetting-sensitizer employed was prepared by adding 0.5 weight percent of $TlCl_3$ to deionized water. The pH was lowered to 2.0 with HCl. 0.5 weight percent of $SnCl_2\cdot 2H_2O$ was added to the resultant solution and the pH was raised to 2.2 with 1 N NaOH to obtain the wetting sensitizer. A 1.0 mil thick copper deposit having greatly enhanced adhesion characteristics was obtained.

($H^1$) The procedure of Example I–(A) was repeated except that the wetting-sensitizer employed was prepared by adding 0.1–5 weight percent of silicon tetrachloride [$SiCl_4$] to concentrated HCl. One weight percent of $SnCl_2\cdot 2H_2O$ was then added. Dissolution was affected by stirring the solution and the solution was allowed, during stirring, to slowly go through its normal hydrolysis, during which $SiCl_4$ slowly reacted. The resultant solution was diluted with water to the ratio of 4 to 1 and stirring was continued for one hour. Concentrated $NH_4OH$ was then added to raise the pH to .5–.8 to obtain the wetting-sensitizer. A 1.0 mil thick copper deposit was obtained.

($I^1$) The procedure of Example I–(A) was repeated except that the wetting-sensitizer employed was prepared by adding 1–2 weight percent of germanium tetrachloride [$GeCl_4$] to concentrated HCl. The resultant solution was diluted with $H_2O$ and the pH raised to about .5 to obtain a colloidal wetting solution. To the wetting solution was added 1.0 weight percent $SnCl_2\cdot 2H_2O$ to obtain the wetting-sensitizer. A 1.0 mil thick copper deposit was obtained.

($J^1$) The procedure of Example I–(A) was repeated except that the wetting-sensitizer employed was prepared by dissolving 1–3 weight percent of stannic chloride [$SnCl_4\cdot 5H_2O$] in 100 ml. of deionized water. The solution was maintained at an elevated temperature (~60° C.) for about one hour until a fluocculate formed. To the supernatant portion of the solution was added one weight percent of $SnCl_2\cdot 2H_2O$ to obtain the wetting-sensitizer. A 1.0 mil thick copper deposit was obtained.

($K^1$) The procedure of Example I–(A) was repeated except that the wetting-sensitizer employed was prepared by dissolving ½–2 weight percent of stannic chloride [$SnCl_4\cdot 5H_2O$] in 100 ml. of deionized water. The solution was allowed to stand for one month until the pH thereof was about .8 to 1.8 and a flocculate formed at the bottom. To the supernatant portion which is wetting was added one weight percent $SnCl_2\cdot 2H_2O$ to obtain the wetting-sensitizer. A 1.0 mil thick copper deposit was obtained.

($L^1$) The procedure of Example I–($K^1$) was repeated except that the bottom layer of the solution (prior to adding $SnCl_2\cdot 2H_2O$), containing the flocculate, had added thereto sufficient HCl to lower the pH to about .8–1.8. At that point, one weight percent of $SnCl_2 \cdot 2H_2O$ was added thereto to obtain the wetting-sensitizer.

($M^1$) The procedure of Example I–(A) was repeated except that the wetting-sensitizer employed was prepared by dissolving one weight percent of sodium hydroxo stannate [$Na_2SnO_3 \cdot 3H_2O$ or $Na_2Sn(OH)_6$] in 100 ml. of deionized water. The pH of the resultant solution was raised to 13 by adding NaOH thereto. 0.5 weight percent of $SnCl_2 \cdot 2H_2O$ was then added and the pH was lowered to 8.5 with HCl thereby resulting in the wetting-sensitizer. A 1.0 mil thick copper deposit was obtained.

($N^1$) The procedure of Example I–(A) was repeated except that the wetting-sensitizer employed was prepared by dissolving one weight percent of lead chloride [$PbCl_2$] in 100 ml. of deionized water. To the solution was added 0.5 weight percent of $SnCl_2 \cdot 2H_2O$. The pH of the resultant solution was raised to 3 by adding 1 N NaOH whereby the wetting-sensitizer was obtained.

($O^1$) The procedure of Example I–(A) was repeated except that the wetting-sensitizer employed was prepared by dissolving one weight percent of bismuth trichloride [$BiCl_3$] in 100 ml. of dilute (pH about .2) HCl. The pH of the resultant solution was raised with NaOH to about 3–4 to obtain a colloidal wetting solution. To the wetting solution was added 0.5 weight percent $SnCl_2 \cdot 2H_2O$ to obtain the wetting-sensitizer. A 1.0 mil thick copper deposit was obtained.

($P^1$) The procedure of Example I–(A) was repeated except that the wetting-sensitizer employed was prepared by dissolving one weight percent of lanthanum nitrate [$La(NO_3)_3 \cdot 6H_2O$] in 100 ml. of deionized water. The initial pH of the solution was raised to about 3 with 1 N NaOH to obtain a colloidal hydrous oxide wetting solution. To the wetting solution was added one weight percent $SnCl_2 \cdot 2H_2O$ to obtain the wetting-sensitizer. A 1.0 mil thick copper deposit was obtained.

($Q^1$) The procedure of Example I–(A) was repeated except that the wetting-sensitizer employed was prepared by forming a 5 weight percent solution of cerous nitrate [$Ce(NO_3)_3 \cdot 6H_2O$] in deionized water. To the resultant solution was added one weight percent of $SnCl_2 \cdot 2H_2O$ and the pH adjusted to 4.5 with NaOH thereby resulting in the wetting-sensitizer. A 1.0 mil thick copper deposit was obtained.

($R^1$) The procedure of Example I–(A) was repeated except that the wetting-sensitizer employed was prepared by forming a 5 weight percent solution of nitratocerate (ceric ammonium nitrate) [$(NH_4)_2 \cdot Ce(NO_3)_6$] in deionized water. The initial pH of (~1.7–1.8) of the resultant solution was raised to about 2.2 with dilute $NH_4OH$ to produce a colloidal hydrous oxide wetting solution. To the wetting solution was added one weight percent of $SnCl_2 \cdot 2H_2O$ to obtain the wetting-sensitizer. A 1.0 mil thick copper deposit was obtained.

($S^1$) The procedure of Example I–(A) was repeated except that the wetting-sensitizer employed was prepared by dissolving one weight percent of thorium chloride [$ThCl_4$] in 100 ml. of deionized water. NaOH was slowly added to the resultant solution to raise the pH to about 4 to produce a colloidal hydrous oxide wetting solution. To the wetting solution was added one weight percent $SnCl_2 \cdot 2H_2O$ to obtain the wetting-sensitizer. A 1.0 mil thick copper deposit was obtained.

($T^1$) The procedure of Example I–(A) was repeated except that the wetting-sensitizer employed was prepared by dissolving one weight percent uranyl nitrate

[$UO_2(NO_3)_2 \cdot 6H_2O$]

in 100 ml. of deionized water. NaOH was then added slowly to raise the pH to about 1.5–2.4 to obtain a yellow wetting solution. To the wetting solution was added 0.5 weight percent of $SnCl_2 \cdot 2H_2O$ to obtain the wetting sensitizer. A 1.0 mil thick copper deposit was obtained.

($U^1$) The procedure of Example I–(A) was repeated except that the wetting-sensitizer used was the wetting solution revealed in Kenney, referred to previously, designated therein as Example XXXIII–D. Specifically, one weight percent of ferric chloride [$FeCl_3 \cdot 6H_2O$] and one weight percent of stannous chloride [$SnCl_2 \cdot 2H_2O$] were dissolved with stirring in 100 ml. of deionized $H_2O$. A pale yellow color wetting solution having a final pH of about 1.4–1.5 resulted. A 1.0 mil thick copper deposit was obtained.

($V^1$) The procedure of Example I–(A) was employed except that the wetting-sensitizer used was the wetting solution revealed in Kenney, referred to previously, designated therein as Example XXXIII–E. Specifically, the wetting solution of Example I–($V^1$) above was dialyzed to a final pH of about 5–5.5. A pale yellow colloidal wetting solution, above the isoelectric point, resulted. A 1.0 mil thick copper deposit was obtained.

($W^1$) The procedure of Example I–(A) was employed except that the wetting-sensitizer used was the wetting solution of Kenney, referred to previously, designated therein as Example XXXIII–F. Specifically, one weight percent of stannous chloride [$SnCl_2 \cdot 2H_2O$] was added to a suspension of Cab-O-Sil® in 100 ml. of deionized $H_2O$. A colorless (milky white) wetting solution resulted. Cab-O-Sil® is Cabot Corporation's trademark for a fumed silica made by flame hydrolysis. A 1.0 mil thick copper deposit was obtained.

($X^1$) The procedure of Example I–(A) was employed except that the wetting-sensitizer used was the wetting solution revealed in Kenney, referred to previously, designated therein as Example XXXIII–G. Specifically, 1–2 weight percent of stannic chloride [$SnCl_4 \cdot 5H_2O$] was dissolved in 100 ml. of deionized $H_2O$. Next 1–5 weight percent of zinc metal was added and the solution was stirred for about one day or until the zinc dissolved. A yellow colored wetting solution resulted. A 1.0 mil thick copper deposit was obtained.

($Y^1$) The procedure of Example I–(A) was employed except that the wetting-sensitizer used was the wetting solution revealed in Kenney, referred to previously, designated therein as Example XXXIII–H. Specifically, 1–3 weight percent of stannous chloride [$SnCl_2 \cdot 2H_2O$] was dissolved in 100 ml. of deionized $H_2O$. Sufficient HCl was added to clear the solution; the final pH of the cleared solution was .5–1.0. About one weight percent of zinc metal was added and dissolved by stirring. A yellow wetting solution resulted. A 1.0 mil thick copper deposit was obtained.

($Z^1$) The procedure of Example I–(A) was employed except that the wetting-sensitizer used was the wetting solution revealed in Kenney, referred to previously, designated therein as Example XXXIII–I. Specifically, 0.5 weight percent of chromic chloride [$CrCl_3 \cdot 6H_2O$] was dissolved in 100 ml. of deionized $H_2O$. There was produced a solution having a pH which ranged from 3.0–3.5 and which had a rich transparent green color. Next, .25 weight percent of zinc metal (30 mesh) was added to the solution. The pH remained approximately the same; the color of the solution now ranged from an emerald green to a blue-green color. The solution was allowed to stand in ambient for at least 48 hours after which stannous chloride

[$SnCl_2 \cdot 2H_2O$]

was added to the solution in a weight concentration of .1% per 100 ml. The pH of the solution dropped to the range 2.3–2.5. Next, there was added slowly 1 N NaOH to the solution while stirring took place. Sufficient NaOH was added to adjust the pH to the range 5.1–5.4. A green wetting solution resulted. A 1.0 mil thick copper deposit was obtained.

($AA^1$) The procedure of Example I–(A) was employed except that the wetting-sensitizer used was the wetting solution revealed in Kenney, referred to previously, designated therein as Example XXXIII–K. Specifically, 1 to 2 weight percent stannous chloride [$SnCl_2 \cdot 2H_2O$] was dissolved in 1 M HCl. About .5 weight percent of palladium chloride [$PdCl_2$] was dissolved in 1 M HCl. The two solutions were intermixed and had added thereto .5 M NaOH until the pH was in the range .8–1.5 whereby a hydrous oxide wetting solution was obtained. A 1.0 mil thick copper pattern was obtained.

($BB^1$) The procedure of Example I–(A) was employed except that the wetting-sensitizer used was a wetting one-step sensitizer-activator solution revealed in Kenney, referred to previously, designated therein as Example XXXIII–L. Specifically, 1 to 2 weight percent palladium chloride [$PdCl_2$] was dissolved in 1 M HCl. To this first solution was added about 2 weight percent stannic chloride [$SnCl_4 \cdot 5H_2O$]. About .3 weight percent stannous chloride [$SnCl_2 \cdot 2H_2O$] was dissolved in 1 M HCl to produce a second solution. The two solutions were intermixed and the pH of the mixture was slowly raised to about 1 with .5 M NaOH to obtain a wetting solution. The substrate was immersed in the wetting solution and directly exposed to a commercially available electroless copper bath wherein a 20 microinch electroless copper deposit was reduced on the substrate.

EXAMPLE II (A) The procedure of Example I–(A) was repeated except that the resultant wetting-sensitizer was capable of functioning as a positive wetting-photopromoter. The resultant coated substrate was selectively exposed to a source of short wavelength ultraviolet radiation to delineate a pattern capable of reducing a precious metal salt to a precious metal. The selectively exposed substrate was then exposed to an aqueous solution comprising 0.05 weight percent $PdCl_2$ wherein a Pd metal-deposited pattern was obtained. The Pd deposited substrate was then immersed in a conventional electroless copper bath to obtain an electroless copper deposited pattern having a thickness of 20 microinches. The electroless copper pattern was then subjected to a conventional copper electroplating treatment whereby a 1.0 mil thick copper pattern was obtained.

(B) The procedure of Example II–(A) was employed except that the wetting-photopromoter employed was the resultant wetting solution of Example I–(B). A 1.0 mil thick copper pattern was obtained.

(C) The procedure of Example II–(A) was employed except that the wetting-photopromoter employed was the resultant wetting solution of Example I–(C). A 1.0 mil thick copper pattern was obtained.

(D) The procedure of Example II–(A) was repeated with the wetting solution of Example I–(D). A 1.0 mil thick copper pattern was obtained.

(E) The procedure of Example II–(A) was repeated with the wetting solution of Example I–(E). A 1.0 mil thick copper pattern was obtained.

(F) The procedure of Example II–(A) was repeated with the wetting solution of Example I–(F). A 1.0 mil thick copper pattern was obtained.

(G) The procedure of Example II–(A) was repeated with the wetting solution of Example I–(G). A 1.0 mil thick copper pattern was obtained.

(H) The procedure of Example II–(A) was repeated except that the wetting photopromoter was the solution of Example I–(H). A 1.0 mil thick copper pattern was obtained.

(I) The procedure of Example II–(A) was repeated except that the wetting-photopromoter was the solution of Example I–(I). A 1.0 mil thick copper pattern was obtained.

(J) The procedure of Example II–(A) was repeated except that the wetting-photopromoter was the solution of Example I–(L). A 1.0 mil thick copper pattern was obtained.

(K) The procedure of Example II–(A) was repeated except that the wetting-photopromoter was the solution of Example I–(M). A 1.0 mil thick copper pattern was obtained.

(L) The procedure of Example II–(A) was repeated except that the wetting-photopromoter was the solution of Example I–(N). A 1.0 mil thick copper pattern was obtained.

(M) The procedure of Example II–(A) was repeated except that the wetting-photopromoter was the solution of Example I–(O). A 1.0 mil thick copper pattern was obtained.

(N) The procedure of Example II–(A) was repeated except that the wetting-photopromoter was the solution of Example I–(P). A 1.0 mil thick copper pattern was obtained.

(O) The procedure of Example II–(A) was repeated except that the wetting-photopromoter was the wetting-sensitizer solution of Example I–(Q). A 1.0 mil thick copper pattern was obtained.

(P) The procedure of Example II–(A) was repeated except that the wetting-photopromoter solution was the solution of Example I–(R). A 1.0 mil thick copper deposit was obtained.

(Q) The procedure of Example II–(A) was repeated except that the wetting-photopromoter solution was the solution of Example I–(S). A 1.0 mil thick copper pattern was obtained.

(R) The procedure of Example II–(A) was repeated except that the wetting-photopromoter solution was the wetting-sensitizer solution of Example I–(T). A 1.0 mil thick copper pattern was obtained.

(S) The procedure of Example II–(A) was repeated except that the wetting-photopromoter solution was the wetting solution of Example I–(U). A 1.0 mil thick copper pattern was obtained.

(T) The procedure of Example II–(A) was repeated except that the wetting-photopromoter was prepared by adding 0.5 weight percent of vanadium tetrachloride [$VCl_4$] to concentrated HCl. The pH was slowly raised to about one by adding water to the resultant solution whereby a brown-red colloid wetting solution was obtained. To the resultant wetting solution was added one weight percent of $SnCl_2 \cdot 2H_2O$ to obtain the wetting-photopromoter. A 1.0 mil thick copper pattern was obtained.

(U) The procedure of Example II–(A) was repeated except that the wetting-photopromoter solution was the solution of Example I–(V). A 1.0 mil thick copper pattern was obtained.

(V) The procedure of Example II–(A) was repeated except that the wetting-photopromoter solution was the solution of Example I–(W). A 1.0 mil thick copper pattern was obtained.

(W) The procedure of Example II–(A) was repeated except that the wetting-photopromoter solution was the wetting-sensitizer solution of Example I–(X). A 1.0 mil thick copper pattern was obtained.

(X) The procedure of Example II–(A) was repeated except that the wetting-photopromoter solution was the solution of Example I–(Y). A 1.0 mil thick copper pattern was obtained.

(Y) The procedure of Example II–(A) was repeated except that the wetting-photopromoter solution was the solution of Example I–(Z). A 1.0 mil thick copper pattern was obtained.

(Z) The procedure of Example II–(A) was repeated except that the wetting-photopromoter solution was the solution of Example I–(AA). A 1.0 mil thick copper pattern was obtained.

(AA) The procedure of Example II–(A) was repeated except that the wetting-photopromoter solution was the solution of Example I–(BB). A 1.0 mil thick copper pattern was obtained.

(BB) The procedure of Example II–(A) was repeated except that the wetting-photopromoter solution was the solution of Example I–(CC). A 1.0 mil thick copper pattern was obtained.

(CC) The procedure of Example II–(A) was repeated except that the wetting-photopromoter solution was the solution of Example I–(DD). A 1.0 mil thick copper pattern was obtained.

(DD) The procedure of Example II–(A) was repeated except that the wetting-photopromoter solution was the solution of Example I–(EE). A 1.0 mil thick copper pattern was obtained.

(EE) The procedure of Example II–(A) was repeated except that the wetting-photopromoter solution was the solution of Example I–(FF). A 1.0 mil thick copper pattern was obtained.

(FF) The procedure of Example II–(A) was repeated except that the wetting-photopromoter solution was the solution of Example I–(GG). A 1.0 mil thick copper pattern was obtained.

(GG) The procedure of Example II–(A) was repeated except that the wetting-photopromoter solution was the solution of Example I–(HH). A 1.0 mil thick copper pattern was obtained.

(HH) The procedure of Example II–(A) was repeated except that the wetting-photopromoter solution was the solution of Example I–(II). A 1.0 mil thick copper pattern was obtained.

(II) The procedure of Example II–(A) was repeated except that the wetting-photopromoter solution was the solution of Example I–(JJ). A 1.0 mil thick copper pattern was obtained.

(JJ) The procedure of Example II–(A) was repeated except that the wetting-photopromoter solution was the solution of Example I–(KK). A 1.0 mil thick copper pattern was obtained.

(KK) The procedure of Example II–(A) was repeated except that the wetting-photopromoter solution was the solution of Example I–(LL). A 1.0 mil thick copper pattern was obtained.

(LL) The procedure of Example II–(A) was repeated except that the wetting-photopromoter solution was the solution of Example I–(MM). A 1.0 mil thick copper pattern was obtained.

(MM) The procedure of Example II–(A) was repeated except that the wetting-photopromoter solution was the solution of Example I–(NN). A 1.0 mil thick copper pattern was obtained.

(NN) The procedure of Example II–(A) was repeated except that the wetting-photopromoter solution was the solution of Example I(OO). A 1.0 mil thick copper pattern was obtained.

(OO) The procedure of Example II–(A) was repeated except that the wetting-photopromoter solution was the solution of Example I–(PP). A 1.0 mil thick copper pattern was obtained.

(PP) The procedure of Example II–(A) was repeated except that the wetting-photopromoter solution was the solution of Example I–(QQ). A 1.0 mil thick copper pattern was obtained.

(QQ) The procedure of Example II–(A) was repeated except that the wetting-photopromoter solution was the solution of Example I–(ZZ). A 1.0 mil thick copper pattern was obtained.

(RR) The procedure of Example II–(A) was repeated except that the wetting-photopromoter solution was the solution of Example I–($A^1$). A 1.0 mil thick copper pattern was obtained.

(SS) The procedure of Example II–(A) was repeated except that the wetting-photopromoter solution was the solution of Example I–($B^1$). A 1.0 mil thick copper pattern was obtained.

(TT) The procedure of Example II–(A) was repeated except that the wetting-photopromoter solution was the solution of Example I–($C^1$). A 1.0 mil thick copper pattern was obtained.

(UU) The procedure of Example II–(A) was repeated except that the wetting-photopromoter solution was the solution of Example I–($D^1$). A 1.0 mil thick copper pattern was obtained.

(VV) The procedure of Example II–(A) was repeated except that the wetting-photopromoter solution was the solution of Example I–($E^1$). A 1.0 mil thick copper pattern was obtained.

(WW) The procedure of Example II–(A) was repeated except that the wetting-photopromoter solution was the solution of Example I–($F^1$). A 1.0 mil thick copper pattern was obtained.

(XX) The procedure of Example II–(A) was repeated except that the wetting-photopromoter solution was the solution of Example I–($G^1$). A very adherent 1.0 mil thick copper pattern was obtained.

(YY) The procedure of Example II–(A) was repeated except that the wetting-photopromoter solution was the solution of Example I–($H^1$). A 1.0 mil thick copper pattern was obtained.

(ZZ) The procedure of Example II–(A) was repeated except that the wetting-photopromoter solution was the solution of Example I–($I^1$). A 1.0 mil thick copper pattern was obtained.

($A^1$) The procedure of Example II–(A) was repeated except that the wetting-photopromoter solution was the solution of Example I–($J^1$). A 1.0 mil thick copper pattern was obtained.

($B^1$) The procedure of Example II–(A) was repeated except that the wetting-photopromoter solution was the solution of Example I–($K^1$). A 1.0 mil thick copper pattern was obtained.

($C^1$) The procedure of Example II–(A) was repeated except that the wetting-photopromoter solution was the solution of Example I–($L^1$). A 1.0 mil thick copper pattern was obtained.

($D^1$) The procedure of Example II–(A) was repeated except that the wetting-photopromoter solution was the solution of Example I–($M^1$). A 1.0 mil thick copper pattern was obtained.

($E^1$) The procedure of Example II–(A) was employed except that the wetting-photopromoter employed was the hydrous tin oxide solution revealed in Kenney, previously referred to, designated therein as Example XXVI–F. Specifically, 100 ml. of deionized $H_2O$ had dissolved therein (1) .1–5 weight percent of stannous chloride [$SnCl_2$] and (2) .1–5 weight percent (with respect to the $H_2O$) of stannic chloride [$SnCl_4$] in any proportion to each other. If required, the pH was adjusted to about .7–1.8. A 1.0 mil thick copper pattern was obtained.

($F^1$) The procedure of Example II–(A) was employed except that the wetting-photopromoter used was the hydrous tin oxide solution revealed in Kenney, previously referred to, designated therein as Example XXVI–G, specifically, one weight percent of stannic chloride

[$SnCl_4 \cdot 5H_2O$]

in powder form was added to 100 ml. of deionized $H_2O$ and the solution stirred until the $SnCl_4$ dissolved. Next 2 weight percent of stannous chloride [$SnCl_2 \cdot 2H_2O$] was added to the solution which was stirred until the $SnCl_2$ was dissolved. Lastly, 1.5 weight percent stannous chloride [$SnCl_2 \cdot 2H_2O$] was added, and stirring was effected until dissolved to obtain the wetting-photopromoter. A 1.0 mil thick copper pattern was obtained.

($G^1$) The procedure of Example II–(A) was employed except that the wetting-photopromoter used was the hydrous tin hydrous oxide containing solution revealed in Kenney, previously referred to, designated therein as Example XXVI–H. Specifically, on weight percent of stannous chloride [$SnCl_2 \cdot 2H_2O$] was dissolved in 100 ml. of deionized $H_2O$. Sufficient HCl was added to lower the pH to about .5–1.5. The solution was then heated at about 55° C. for 2 hours until a pale yellow wetting solution was produced. (Alternatively to or in addition to heating, $H_2O_2$ may be added.) A 1.0 mil thick copper pattern was obtained.

($H^1$) The procedure of Example II–(A) was employed except that the wetting-photopromoter used was prepared by adding 1–2 weight percent of stannic chloride [$SnCl_4$] to concentrated HCl. The initial pH of this solution was raised to within the range .5–.8 with NaOH to obtain a wetting solution. To the wetting solution was added 0.2 weight percent $SnCl_2 \cdot 2H_2O$ to obtain the wetting-photopromoter. A 1.0 mil thick copper pattern was obtained.

($I^1$) The procedure of Example II–(A) was repeated except that the wetting-photopromoter solution was the solution of Example I–($N^1$). A 1.0 mil thick copper pattern was obtained.

($J^1$) The procedure of Example II–(A) was repeated except that the wetting-photopromoter solution was the solution of Example I–($O^1$). A 1.0 mil thick copper pattern was obtained.

($K^1$) The procedure of Example II–(A) was repeated except that the wetting-photopromoter solution was the solution of Example I–($P^1$). A 1.0 mil thick copper pattern was obtained.

($L^1$) The procedure of Example II–(A) was repeated except that the wetting-photopromoter solution was the solution of Example I–($Q^1$). A 1.0 mil thick copper pattern was obtained.

($M^1$) The procedure of Example II–(A) was repeated except that the wetting-photopromoter solution was the solution of Example I–($R^1$). A 1.0 mil thick copper pattern was obtained.

($N^1$) The procedure of Example II–(A) was repeated except that the wetting-photopromoter solution was the solution of Example I–($S^1$). A 1.0 mil thick copper pattern was obtained.

($O^1$) The procedure of Example II–(A) was employed except that the wetting-photopromoter used was the tin hydrous oxide containing solution of Example I–($U^1$). A 1.0 mil thick copper pattern was obtained.

($P^1$) The procedure of Example II–(A) was employed except that the wetting-photopromoter used was the tin hydrous oxide containing solution of Example I–($V^1$). A 1.0 mil thick copper pattern was obtained.

($Q^1$) The procedure of Example II–(A) was employed except that the wetting-photopromoter used was the tin hydrous oxide containing solution of Example I–($W^1$). A 1.0 mil thick copper pattern was obtained.

($R^1$) The procedure of Example II–(A) was employed except that the wetting-photopromoter used was the tin hydrous oxide containing solution of Example I–($X^1$). A 1.0 mil thick copper pattern was obtained.

($S^1$) The procedure of Example II–(A) was employed except that the wetting-photopromoter used was the tin hydrous oxide containing solution of Example I–($Y^1$). A 1.0 mil thick copper pattern was obtained.

($T^1$) The procedure of Example II–(A) was employed except that the wetting-photopromoter used was the tin hydrous oxide containing solution of Example I–($Z^1$). A 1.0 mil thick copper pattern was obtained.

($U^1$) The procedure of Example II–(A) was employed except that the wetting-photopromoter used was the tin hydrous oxide containing solution of Example I–($AA^1$). A 1.0 mil thick copper pattern was obtained.

($V^1$) The procedure of Example II–(A) was employed except that the wetting-photopromoter used was the wetting-sensitizer solution of Example I–($T^1$). A 1.0 mil thick copper pattern was obtained.

EXAMPLE III (A) A polytetrafluoroethylene substrate, commercially obtained, was rendered hydrophilic by immersion in a colloidal wetting solution, revealed in Kenney, referred to previously, designated therein as Example X–A. Specifically, the colloidal wetting solution was prepared by dissolving one weight percent of ferric chloride [$FeCl_3 \cdot 6H_2O$] in 100 ml. of deionized water. Dissolution was aided by gradually heating to about 50–80° C. and stirring. At a pH of about 1.7–1.9 a tan wetting solution was produced.

The now hydrophilic substrate was then treated with an aqueous 0.1 molar $SnCl_2 \cdot 2H_2O$ solution (a non-wetting positive photopromoter solution) to form a photopromoter layer on a surface of the substrate (as described in FIG. 1). The photopromoter layer was then exposed to a source of short wavelength ultraviolet radiation to delineate a pattern capable of reducing a precious metal salt to a precious metal. The selectively exposed substrate was then exposed to an aqueous solution comprising 0.05 weight percent $PdCl_2$ wherein a Pd metal-deposited pattern was obtained on the substrate. The Pd deposited substrate was then immersed in a commercial electroless copper bath comprising copper sulfate, formaldehyde, complexer, caustic, to obtain an electroless copper pattern having a thickness of 20 microinches. The electroless pattern was then subjected to a conventional copper electroplating treatment whereby a 1.0 mil thick copper pattern was obtained.

(B) The procedure of Example III–(A) was repeated except that after rendering the substrate hydrophilic, the 0.1 molar $SnCl_2 \cdot 2H_2O$ solution was used as a sensitizer (non-wetting) in a conventional electroless plating sequence. After immersion in the 0.1 molar $SnCl_2 \cdot 2H_2O$ solution, the sensitized substrate was immersed in an aqueous activating solution comprising 0.05 weight percent $PdCl_2$. The activated substrate was then immersed in the commercially obtained electroless copper plating bath, of Example III–(A) to obtain a 20 microinch electroless copper deposit. Electroplating was then carried out resulting in a 1.0 mil thick copper deposit.

It is to be understood that the above-described embodiments are simply illustrative of the principles of the invention. Various other modifications and changes may be devised by those skilled in the art which will embody the principles of the invention and fall within the spirit and scope thereof.

What is claimed is:

1. In an improved method of depositing a metal on a surface of a non-conductive substrate, which comprises:

(a) sensitizing the surface;

(b) activating the sensitized surface; and (c) exposing the activated surface to a suitable electroless bath to deposit electroless metal thereon, the improvement comprising:

sensitizing the surface with a wetting-sensitizer comprising a sensitizing species combined with a stable aqueous colloidal solution, formed by a hydrolysis and nucleation reaction, comprising insoluble hydrous oxide particles of one or more selected elements, said particles having a size within the range of 10 A. to 10,000 A. and said hydrolysis reaction including at least (1) dissolution of a salt of said selected elements in an aqueous medium and (2) maintenance of the pH of said aqueous medium at a point where no flocculate results.

2. The method as defined in claim 1 wherein said sensitizing species comprises $Sn^{+2}$ ions.

3. The method as defined in claim 1 wherein said one or more elements is selected from the group consisting of Be, Mg, Ti, Zr, V, Cr, Mo, W, Mn, Fe, Co, Ni, Pd, Pt, Cu, Ag, Au, Zn, Cd, Hg, Al, In, Tl, Si, Ge, Sn, Pb, Bi, La, Ce, Th, U and mixtures thereof.

4. In an improved method of depositing a metal on a surface of a substrate, which comprises:

(a) sensitizing the surface;

(b) activating the sensitized surface; and (c) exposing the activated surface to a suitable electroless bath to deposit electroless metal thereon, the improvement comprising:

sensitizing the surface with a wetting colloidal sensitizing solution comprising insoluble hydrous oxide particles of an element selected from the group consisting of Sn, Ti and Pb.

5. In an improved method of depositing a metal on a surface of a substrate, which comprises:

(a) sensitizing the surface;

(b) activating the sensitized surface; and (c) exposing the activated surface to a suitable electroless metal plating solution to deposit electroless metal thereon, the improvement comprising:

in step (a) sensitizing the surface with a colloidal wetting solution comprising insoluble hydrous oxide particles of Sn; and in step (b) activating the sensitized surface with a solution comprising $Pd^{+2}$ ions.

6. A method of electrolessly depositing a metal on a surface of a substrate which comprises treating the surface, prior to electroless deposition of a desired metal thereon, with a colloidal wetting activating solution comprising an insoluble hydrous oxide of an activating metal selected from the group of activating metals consisting of Pd, Pt, Ag, Au and mixtures thereof.

7. A method of electrolessly depositing a metal on a surface of a substrate, which comprises:

(a) treating the surface with a colloidal wetting one-step sensitizer-activator comprising hydrous oxide particles of a catalytic metal selected from the group of metals consisting of Pd, Pt, Ag, Au and mixtures thereof; and (b) exposing said treated surface to a suitable electroless metal bath, catalyzed by a species of said one-step sensitizer-activator, to deposit electroless metal thereon.

8. A method of depositing a metal on a non-wettable surface of a substrate, which comprises:

(a) treating the surface with a stable aqueous colloidal solution, formed by a hydrolysis and nucleation reaction, comprising insoluble hydrous oxide particles of one or more selected elements, said particles having a size within the range of 10 A. to 10,000 A. and said hydrolysis reaction including at least (1) dissolution of a salt of said selected elements in an aqueous medium and (2) maintenance of the pH of said aqueous medium at a point where no fluocculate results, to render the surface wettable;

(b) sensitizing said wettable surface with a sensitizing solution;

(c) activating said sensitized surface; and (d) treating said activated surface with a suitable electroless plating solution to deposit electroless metal thereon.

9. The method as defined in claim 8, wherein said one or more elements is selected from the group consisting of Be, Mg, Ti, Zr, V, Cr, Mo, W, Mn, Fe, Co, Ni, Pd, Pt, Cu, Ag, Au, Zn, Cd, Hg, Al, In, Tl, Si, Ge, Sn, Pb, Bi, La, Ce, Th, U and mixtures thereof.

10. In an improved method of rendering an article selectively capable of reducing thereon a precious metal from a precious metal salt which comprises:

(a) coating the article with a photopromoter solution; and then (b) producing a pattern capable of reducing the precious metal from the precious metal salt by selectively exposing portions of the coated article to a source of short wavelength ultraviolet radiation, wherein the improvement comprises:

coating the article with a solution comprising a position photopromoter species, selected from the group of positive photopromoter species consisting of Sn compounds, Ti compounds, Pb compounds, and mixtures thereof, combined with a stable aqueous colloidal solution, formed by a hydrolysis and nucleation reaction, comprising insoluble hydrous oxide particles of one or more selected elements, said particles having a size within the range of 10 A. to 10,000 A. and said hydrolysis reaction including at least (1) dissolution of a salt of said selected elements in an aqueous medium and (2) maintenance of the pH of said aqueous medium at a point where no flocculate results.

11. The method as defined in claim 10 wherein said one or more elements is selected from the group consisting of Be, Mg, Ti, Zr, V, Cr, Mo, W, Mn, Fe, Co, Ni, Pd, Pt, Cu, Ag, Au, Zn, Cd, Hg, Al, In, Tl, Si, Ge, Sn, Pb, Bi, La, Ce, Th, U and mixtures thereof.

12. The method as defined in claim 10 wherein said Sn compound comprises a hydrous tin oxide;

said Ti compound comprises a hydrous titanium oxide; and said Pb compound comprises a hydrous lead oxide.

13. In an improved method of producing a precious metal pattern selected from the group of metals consisting of Pd, Pt, Ag and Au, on a surface of a substrate, the pattern being usable to catalyze and reduce thereon metal from an electroless bath, which comprises:

(a) treating the surface with a positive photopromoter comprising a tin compound;

(b) selectively exposing the treated surface to a source of ultraviolet radiation to delineate a pattern capable of reducing a precious metal, selected from the group consisting of Pd, Pt, Ag and Au, from ions thereof; and (c) exposing the pattern to a source of precious metal ions, selected from the group of metals consisting of Pd, Pt, Ag, and Au, to produce the precious metal pattern, wherein the improvement comprises:

in step (a) treating the surface with a solution comprising the tin compound combined with a stable aqueous colloidal solution, formed by a hydrolysis and nucleation reaction, comprising insoluble hydrous oxide particles of one or more selected elements, said particles having a size within the range of 10 A. to 10,000 A. and said hydrolysis reaction including at least (1) dissolution of a salt of said selected elements in an aqueous medium and (2) maintenance of the pH of said aqueous medium at a point where no flocculate results.

14. The method as defined in claim 13 wherein said one or more elements is selected from the group consisting of Be, Mg, Ti, Zr, V, Cr, Mo, W, Mn, Fe, Co, Ni, Pd, Pt, Cu, Ag, Au, Zn, Cd, Hg, Al, In, Tl, Si, Ge, Sn, Pb, Bi, La, Ce, Th, U and mixtures thereof.

15. In an improved method of producing a metallic pattern on a surface of a substrate, which comprises:

(a) coating the surface with a photopromoter solution comprising a compound of a metal selected from the group consisting of tin, titanium, lead;

(b) producing a pattern capable of reducing a precious metal from a precious metal salt by selectively exposing portions of the coated surface to a source of short wavelength ultraviolet radiation;

(c) immersing the patterned surface in a precious metal salt solution to reduce on the pattern the precious metal; and (d) exposing the precious metal pattern to an electroless plating bath, which is catalyzed by the reduced precious metal, to deposit an electroless metal deposit thereon, wherein the improvement comprises:

coating the surface with a photopromoter solution comprising the metal compound in combination with a stable aqueous colloidal solution, formed by a hydrolysis and nucleation reaction, comprising insoluble hydrous oxide particles of one or more selected elements, said particles having a size within the range of 10 A. to 10,000 A. and said hydrolysis reaction including at least (1) dissolution of a salt of said selected elements in an aqueous medium and (2) maintenance of the pH of said aqueous medium at a point where no flocculate results.

16. The method as defined in claim 15 wherein said one or more elements is selected from the group consisting of Be, Mg, Ti, Zr, V, Cr, Mo, W, Mn, Fe, Co, Ni, Pd, Pt, Cu, Ag, Au, Zn, Cd, Hg, Al, In, Tl, Si, Ge, Sn, Pb, Bi, La, Ce, Th, U and mixtures thereof.

17. The method as defined in claim 15 wherein:

said tin compound comprises a hydrous tin oxide;

said titanium compound comprises a hydrous titanium oxide;

said lead compound comprises a hydrous lead oxide; and said precious metal salts are salts of metals selected from the group consisting of palladium, platinum, gold and silver.

18. In an improved method of producing an electrical circuit pattern on a nonconductive substrate, which comprises:

(a) selecting a photopromoter comprising a metal compound selected from the group of metals consisting of tin, titanium, lead and mixtures thereof;

(b) coating the substrate with a solution containing the metal compound;

(c) selectively exposing the coated substrate to a suitable source of ultraviolet radiation to generate a first pattern, corresponding to the electrical circuit pattern, and a second pattern, the first pattern being capable of reducing a precious metal from a salt solution thereof, the second pattern being incapable of reducing a precious metal;

(d) selecting a precious metal salt from the group of precious metals consisting of palladium, platinum, gold and silver, said precious metal being catalytic to an electroless plating bath;

(e) immersing the exposed substrate in a solution containing the precious metal salt, the first pattern reducing the precious metal thereon to generate a precious metal pattern; and then (f) immersing the precious metal pattern in an electroless plating bath to produce the electrical circuit pattern, the improvement comprising:

in step (b) the solution comprises the metal compound and a stable aqueous colloidal solution, formed by a hydrolysis and nucleation reaction, comprising insoluble hydrous oxide particles of one or more selected elements, said particles having a size within the range of 10 A. to 10,000 A. and said hydrolysis reaction including at least (1) dissolution of a salt of said selected elements in an aqueous medium and (2) maintenance of the pH of said aqueous medium at a point where no flocculate results.

19. The method as defined in claim 18 wherein said one or more elements is selected from the groups consisting of Be, Mg, Ti, Zr, V, Cr, Mo, W, Mn, Fe, Co, Ni, Pd, Pt, Cu, Ag, Au, Zn, Cd, Hg, Al, In, Tl, Si, Ge, Sn, Pb, Bi, La, Ce, Th, U and mixtures thereof.

20. The method as defined in claim 18 which comprises the additional step of electroplating metal onto said electrical circuit pattern.

21. The method as defined in claim 20 which comprises the additional step of removing the substrate from said electroplated circuit pattern.

22. A method of rendering a hydrophobic article selectively capable of reducing thereon a precious metal from a precious metal salt which comprises:

(a) treating the hydrophobic article with a first solution comprising a stable aqueous colloidal solution, formed by a hydrolysis and nucleation reaction, comprising insoluble hydrous oxide particles of one or more selected elements, said particles having a size within the range of 10 A. to 10,000 A. and said hydrolysis reaction including at least (1) dissolution of a salt of said selected elements in an aqueous medium and (2) maintenance of the pH of said aqueous medium at a point where no fluocculate results, to render the article hydrophilic;

(b) coating said hydrophilic article with a second solution comprising a photopromoter selected from the group of photopromoters consisting of tin compounds, titanium compounds, lead compounds and mixtures thereof; and (c) producing a pattern capable of reducing a precious metal from a precious metal salt by selectively exposing portions of said photopromoter-coated article to a source of short wavelength ultraviolet radiation.

23. The method as defined in claim 22 wherein said one or more elements is selected from the group consisting of Be, Mg, Ti, Zr, V, Cr, Mo, W, Mn, Fe, Co, Ni, Pd, Pt, Cu, Ag, Au, Zn, Cd, Hg, Al, In, Tl, Si, Ge, Sn, Pb, Bi, La, Ce, Th, U and mixtures thereof.

24. A method of producing a metallic pattern on a surface of a non-wettable substrate, which comprises:

(a) treating the surface with a first solution comprising a stable aqueous colloidal wetting solution, formed by a hydrolysis and nucleation reaction, comprising insoluble hydrous oxide particles of one or more selected elements, said particles having a size within the range of 10 A. to 10,000 A. and said hydrolysis reaction including at least (1) dissolution of a salt of said selected elements in an aqueous medium and (2) maintenance of the pH of said aqueous medium at a point where no flocculate results, to render the surface wettable;

(b) coating said wettable surface with a second solution comprising a photopromoter selected from the group of photopromoters consisting of a tin compound, a titanium compound, a lead compound and mixtures thereof;

(c) selectively exposing said photopromoter-coated surface to a source of ultraviolet radiation to delineate a pattern thereon capable of reducing a precious metal, selected from the group of metals consisting of Pd, Pt, Ag and Au, from a salt thereof;

(d) exposing said pattern delineated surface to a salt of a previous metal, selected from the group consisting of Pd, Pt, Ag and Au, to reduce thereon a precious metal deposit; and (e) placing said precious metal-deposited pattern in an electroless plating bath, which is catalyzed by said reduced precious metal, to produce the metallic pattern.

25. The method as defined in claim 22 wherein said one or more elements is selected from the group consisting of Be, Mg, Ti, Zr, V, Cr, Mo, W, Mn, Fe, Co, Ni, Pd, Pt, Cu, Ag, Au, Zn, Cd, Hg, Al, In, Tl, Si, Ge, Sn, Pb, Bi, La, Ce, Th, U and mixtures thereof.

26. A method of rendering a hydrophobic article selectively capable of reducing thereon a precious metal from a precious metal salt which comprises:

(a) treating the hydrophobic article with a first solution comprising a stable aqueous colloidal solution, formed by a hydrolysis and nucleation reaction, comprising insoluble hydrous oxide particles of one or more selected elements, said particles having a size within the range of 10 A. to 10,000 A. and said hydrolysis reaction including at least (1) dissolution of a salt of said selected elements in an aqueous medium and (2) maintenance of the pH of said aqueous medium at a point where no flocculate results, to render the article hydrophilic;

(b) coating said hydrophilic article with a second solution comprising a photopromoter selected from the group of photopromoters consisting of iron compounds and mercury compounds; and (c) producing a pattern capable of reducing a precious metal from a precious metal salt by selectively exposing portions of said photopromoter coated article to a source of short wavelength radiation.

27. The method as defined in claim 26 wherein said one or more elements is selected from the group consisting of Be, Mg, Ti, Zr, V, Cr, Mo, W, Mn, Fe, Co, Ni, Pd, Pt, Cu, Ag, Au, Zn, Cd, Hg, Al, In, Tl, Si, Ge, Sn, Pb, Bi, La, Ce, Th, U and mixtures thereof.

28. A method of producing a metallic pattern on a surface of a non-wettable substrate, which comprises:

(a) treating the surface with a first solution comprising a stable aqueous colloidal wetting solution, formed by a hydrolysis and nucleation reaction, comprising insoluble hydrous oxide particles of one or more selected elements, said particles having a size within the range of 10 A. to 10,000 A., and said hydrolysis reaction including at least (1) dissolution of a salt of said selected elements in an aqueous medium and (2) maintenance of the pH of said aqueous medium at a point where no flocculate results, to render the surface wettable;

(b) coating said wettable surface with a second solution comprising a photopromoter selected from the group of photopromoters consisting of an iron compound and a mercury compound;

(c) selectively exposing said photopromoter coated surface to a source of ultraviolet radiation to delineate a pattern thereon capable of reducing a precious metal, selected from the group of metals consisting of Pd, Pt, Ag, Au and mixtures thereof, from a salt thereof;

(d) exposing said pattern delineated surface to a salt of a precious metal, selected from the group consisting of Pd, Pt, Ag, Au and mixtures thereof to reduce thereon a precious metal deposit; and (e) placing said precious metal deposited pattern in an electroless plating bath, which is catalyzed by said reduced precious metal, to produce the metallic pattern.

29. The method as defined in claim 28 wherein said one or more elements is selected from the group consisting of Be, Mg, Ti, Zr, V, Cr, Mo, W, Mn, Fe, Co, Ni, Pd, Pt, Cu, Ag, Au, Zn, Cd, Hg, Al, In, Tl, Si, Ge, Sn, Pb, Bi, La, Ce, Th, U and mixtures thereof.

30. A method of rendering an article selectively capable of reducing thereon a precious metal from a precious metal salt, which comprises:

(a) coating the article with a colloidal positive photopromoter solution comprising a positive photopromoter species selected from the group of positive photopromoter species consisting of (1) insoluble colloidal hydrous tin oxide particles, (2) insoluble colloidal hydrous titanium oxide particles, (3) insoluble colloidal hydrous lead oxide particles and (4) mixtures thereof; and (b) producing a pattern capable of reducing a precious metal from a precious metal salt by selectively exposing portions of said coated article to a source of short wavelength ultraviolet radiation.

31. A method of producing a precious metal pattern on a surface of a substrate, the pattern being usable to catalyze and reduce thereon metal from an electroless bath, which comprises:

(a) effecting retention on selected areas of the substrate of a first colloidal solution comprising a positive photopromoter species selected from the group of positive photopromoter species consisting of (1) insoluble colloidal hydrous tin oxide particles, (2) insoluble colloidal hydrous titanium oxide particles, (3) insoluble colloidal hydrous lead oxide particles and (4) mixtures thereof;

(b) selectively exposing said selected areas to a suitable source of ultraviolet radiation to generate a photopromoter pattern capable of reducing the precious metal from a salt of the precious metal; and (c) immersing said pattern in a second solution comprising a salt of the precious metal to produce the precious metal pattern.

32. A method of producing a metallic pattern on a nonconductive substrate, which comprises:

(a) absorbing onto selected surfaces of the substrate a colloidal solution comprising a positive photopromoter comprising a positive photopromoter species selected from the group of positive photopromoter species consisting of (1) an insoluble colloidal hydrous tin oxide, (2) an insoluble colloidal hydrous titanium oxide, (3) an insoluble colloidal hydrous lead oxide and (4) mixtures thereof;

(b) exposing selected portions of the selected surfaces to a source of ultraviolet radiation to render said positive photopromoter species thereon incapable of reducing a precious metal from a precious metal salt, the selected portions conforming to a negative of the pattern;

(c) immersing the substrate in a precious metal solution to reduce a precious metal and to deposit said reduced precious metal onto surfaces unexposed to said radiation source; and (d) immersing the substrate in an electroless metal plating bath, which is catalyzed by said reduced metal, to produce the metallic pattern.

33. A method of producing metallic pattern on a surface of a substrate, which comprises:

(a) treating the surface with a positive photopromoter colloid solution comprising insoluble colloidal hydrous tin oxide particles to deposit said particles on the surface;

(b) selectively exposing said treated surface to a source of ultraviolet radiation to delineate a pattern capable of reducing a precious metal, selected from the group consisting of Pd, Pt, Ag and Au, from a compound thereof;

(c) exposing said pattern to a solution comprising a compound of a precious metal, selected from the group consisting of Pd, Pt, Ag and Au, to deposit a precious metal thereon; and (d) exposing said precious metal-deposited pattern to an electroless plating bath, catalyzed by said precious metal, to produce the metallic pattern.

34. A method of producing an electrical circuit pattern on a nonconductive substrate which comprises the steps of:

(a) coating the substrate with a colloidal solution comprising insoluble colloidal particles of a hydrous oxide of a metal selected from the group consisting of tin, titanium, lead and mixtures thereof;

(b) selectively exposing said coated substrate to a suitable source of ultraviolet radiation to delineate a pattern capable of reducing a precious metal from a salt solution thereof, said pattern conforming to the electrical circuit pattern;

(c) immersing said pattern in a solution comprising a precious metal salt, selected from the group of precious metals consisting of palladium, platinum, gold, silver and mixtures thereof, said precious metal being catalytic to an electroless plating bath, to reduce thereon said precious metal to form a precious metal pattern conforming to the electrical circuit pattern; and (d) immersing said precious metal pattern in an electroless plating bath to produce the electrical circuit pattern.

35. The method of claim 34 which comprises the additional step of:

electroplating metal onto the electrical circuit pattern.

36. The method of claim 35 which comprises the additional step of:

removing the substrate from the electroplated circuit pattern.

References Cited

UNITED STATES PATENTS

| | | | |
|---|---|---|---|
| 3,562,005 | 2/1971 | De Angelo et al. | 117—212 |
| 3,562,038 | 2/1971 | Shipley et al. | 117—213 |
| 3,668,003 | 6/1972 | Furness | 117—213 |
| 3,657,003 | 4/1972 | Kenney | 117—34 |

RALPH S. KENDALL, Primary Examiner

J.W. MASSIE, Assistant Examiner

U.S. Cl. X.R.

117—34, 47, 213; 204—15

UNITED STATES PATENT OFFICE
CERTIFICATE OF CORRECTION

Patent No. 3,783,005 Dated January 1, 1974

Inventor(s) J. T. Kenney

It is certified that error appears in the above-identified patent and that said Letters Patent are hereby corrected as shown below:

Column 2, line 58, "brightners" should read -- brightness -- . Column 5, line 3, "XXXIII-F" should not be centered.

Column 6, line 38, "substractive" should read --subtractive--; line 44, "suface" should read --surface--; line 54, "substrate" should read --substance--. Column 7, line 12, "SnSo4" should read --$SnSO_4$--; line 30, "XXXIII—" should read --XXXIII-J--; line 36, "tartarate" should read --tartrate--.

Column 10, line 39, "1.0-1.5 A. 1.0" should read --1.0-1.5. A 1.0--; line 60, "Examhple" should read --Example--; line 74, "titanium" should read --titanium metal--. Column 11, line 3, "1 N NaOH" should read --1N-NaOH .

Column 14, line 14, "1 N NaOH" should read --1N-NaOH--; line 34, "catalyst" should read --catalyzed--; line 44, "was slowly" should read --was then slowly--. Column 15, line 32, "1 N NaOH" should read --1N-NaOH--; line 73, "1 N NaOH" should read --1N-NaOH--. Column 16, line 28, "1 N NaOH" should read --1N-NaOH--. Column 17, line 17, "1 N NaOH" should read --1N-NaOH--; line 50, "$[(NH_4)_2.Ce(NO_3)_6]$" should read --$[(NH_4)_2[Ce(NO_3)_6]$--. Column 18, line 68, "1 N NaOH" should read --1N-NaOH--. Column 19, line 3, "1 M HCl" should read --1-M HCl--; line 4, "1 M HCl" should read --1-M HCl--; line 5, ".5 M NaOH" should read --.5-M NaOH--; line 14, "1 M HCl" should read --1-M HCl--; line 17, "1 M HCl" should read --1-M HCl--; line 20, ".5 M NaOH"

UNITED STATES PATENT OFFICE
CERTIFICATE OF CORRECTION

Patent No. 3,783,005 Dated January 1, 1974

Inventor(s) J. T. Kenney

It is certified that error appears in the above-identified patent and that said Letters Patent are hereby corrected as shown below:

should read --.5-M NaOH--. Column 22, line 73, "on weight" should read --one weight--.

In the claims, Column 25, claim 10, lines 73 and 74, "po-sition" should read --positive--. Column 29, claim 26, line 8, "wavelength" should read --wavelength ultraviolet--. Column 30, claim 33, line 33, "producing" should read --producing a--.

Signed and sealed this 6th day of August 1974.

(SEAL)
Attest:

McCOY M. GIBSON, JR.
Attesting Officer

C. MARSHALL DANN
Commissioner of Patents